(12) United States Patent
Matsumoto et al.

(10) Patent No.: US 8,038,292 B2
(45) Date of Patent: Oct. 18, 2011

(54) HEAD MOUNTED DISPLAY DEVICE

(75) Inventors: Shigeru Matsumoto, Toyokawa (JP);
Mitsugi Tanaka, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 12/659,622

(22) Filed: Mar. 15, 2010

(65) Prior Publication Data

US 2010/0245754 A1 Sep. 30, 2010

(30) Foreign Application Priority Data

Mar. 30, 2009 (JP) .................. 2009-080759

(51) Int. Cl.
*G02C 1/00* (2006.01)
(52) U.S. Cl. ........................... 351/158; 351/121
(58) Field of Classification Search .............. 351/41, 351/111, 113, 114, 119, 121, 158; 359/630
See application file for complete search history.

(56) References Cited

U.S. PATENT DOCUMENTS

| | | | |
|---|---|---|---|
| 4,869,575 | A | 9/1989 | Kubik |
| 6,204,974 | B1 | 3/2001 | Spitzer |
| 7,497,574 | B2 | 3/2009 | Watanabe et al. |
| 2009/0146916 | A1 | 6/2009 | Moliton |
| 2009/0251661 | A1* | 10/2009 | Fuziak, Jr. .............. 351/158 |
| 2010/0073262 | A1* | 3/2010 | Matsumoto .............. 345/8 |

FOREIGN PATENT DOCUMENTS

| | | |
|---|---|---|
| EP | 0 899 599 A2 | 3/1999 |
| FR | 2 894 682 A1 | 6/2007 |
| JP | A-2000-249972 | 9/2000 |
| JP | A-2007-148131 | 6/2007 |

OTHER PUBLICATIONS

Sep. 6, 2010 Search Report issued in European Application No. 10250495.8.
Dec. 27, 2010 Search Report issued in European Application No. 10250495.8.

* cited by examiner

*Primary Examiner* — Huy K Mai
(74) *Attorney, Agent, or Firm* — Oliff & Berridge, PLC

(57) ABSTRACT

A head mounted display device comprises a frame, an image display unit, an extension member and a retaining mechanism. The frame includes a front part, a connection part and a temple part. The front part is mountable on a user's nose and extends in a right-and-left direction in front of the user's eye. The connection part is fixed to at least one edge portion of right and left side edges of the front part and extends in a rearward direction from the one edge portion. The temple part is mountable on the user's ear and rotatably connected with the connection part around a rotation axis extending along an up-and-down direction. The image display unit includes an optical system and is configured to generate an image to be displayed for the user. The extension member extends in a forward direction from the one edge portion. The retaining mechanism is configured to detachably retain the image display unit in the extension member.

15 Claims, 21 Drawing Sheets

FIG. 1
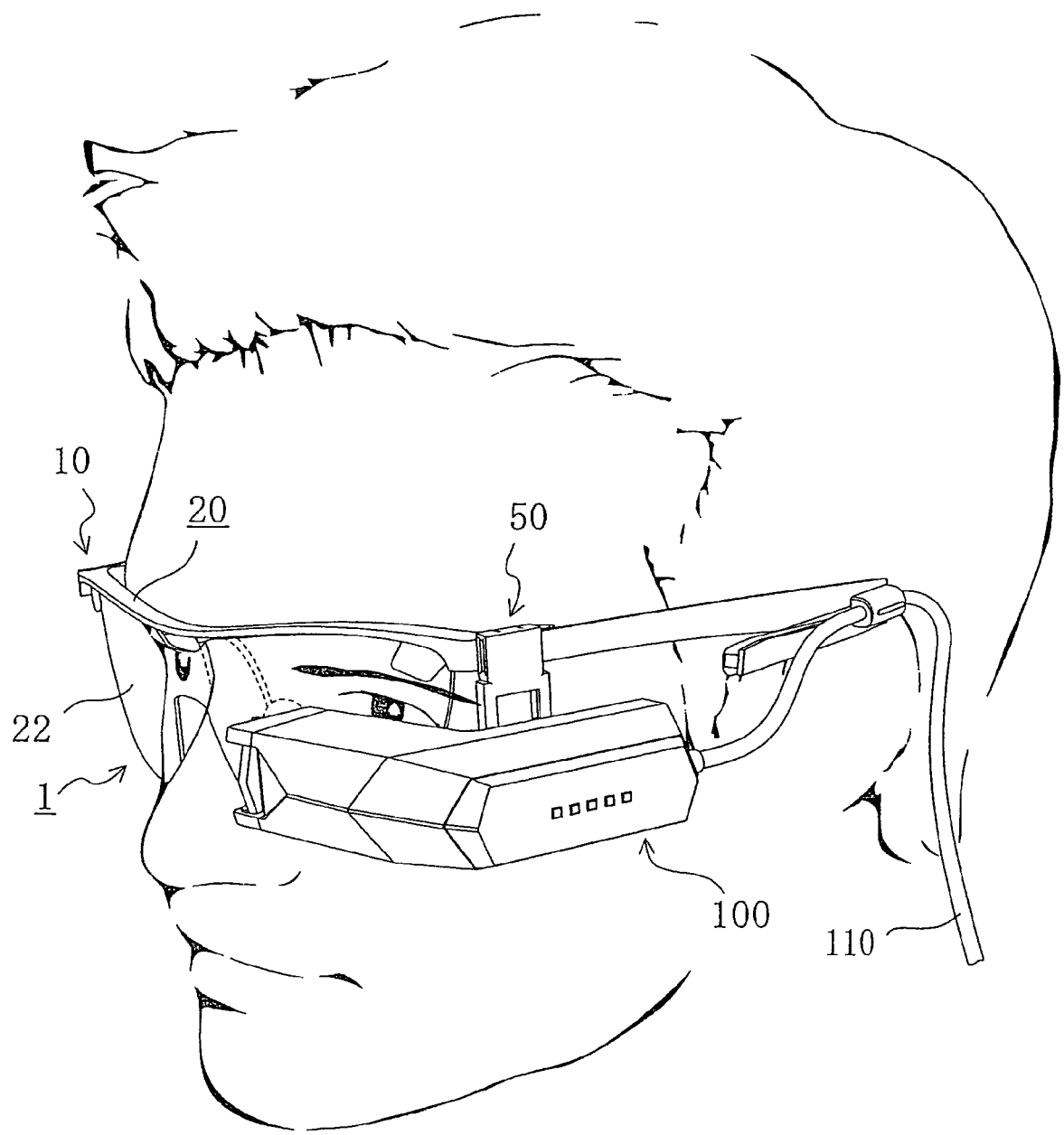
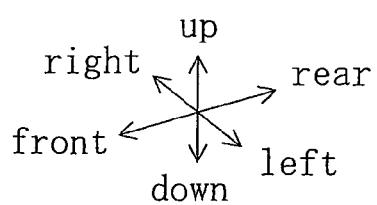

FIG. 7
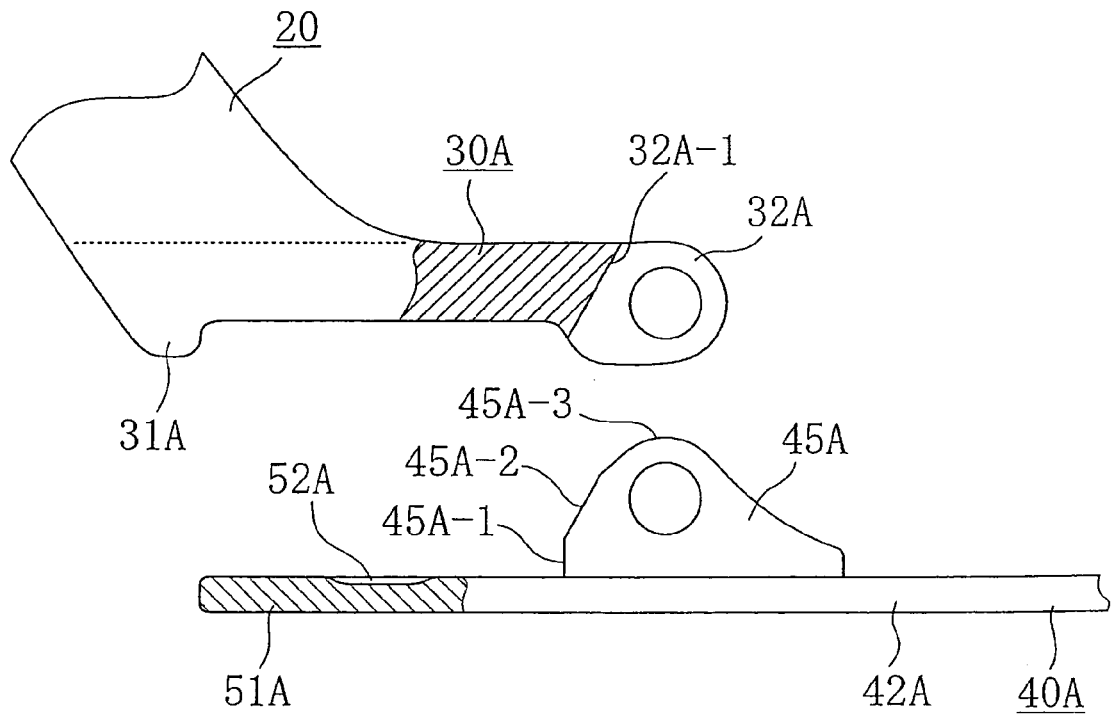
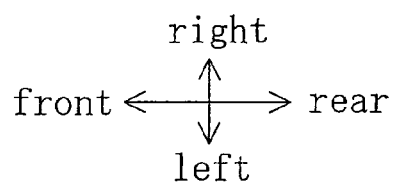
FIG. 8A
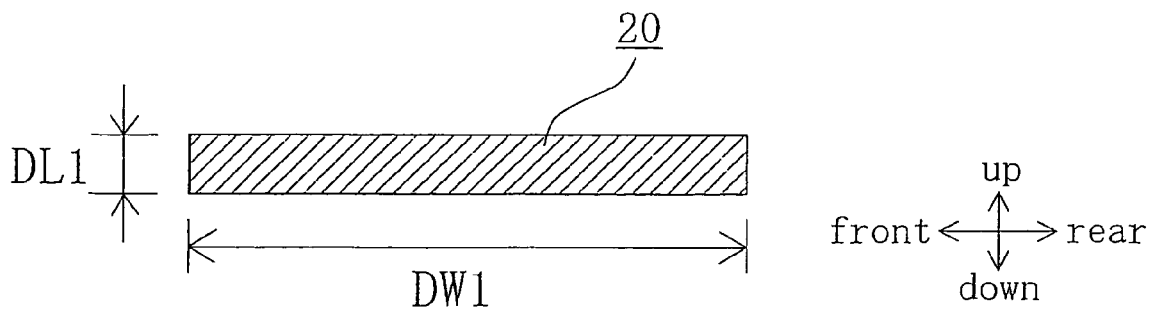

FIG. 15A
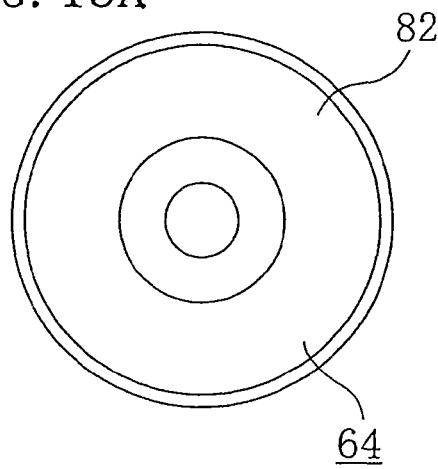
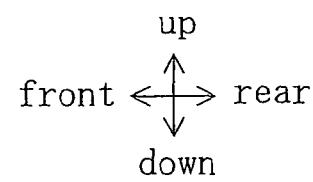
FIG. 15B
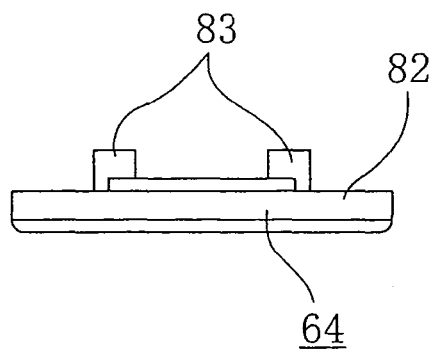
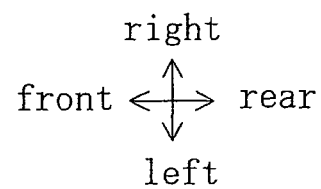
FIG. 15C
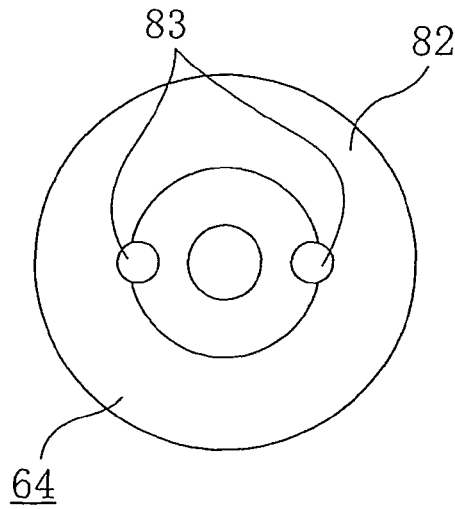
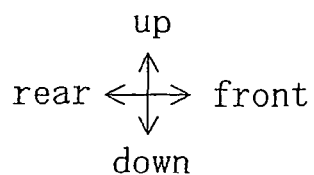

HEAD MOUNTED DISPLAY DEVICE

CROSS REFERENCE TO RELATED APPLICATION

The application claims priority from Japanese Patent Application No. 2009-080759, filed on Mar. 30, 2009, the entire subject matter of which is incorporated herein by reference.

BACKGROUND OF THE DISCLOSURE

1. Field of the Disclosure

The disclosed feature relates to a head mounted display device, in which an image display unit is attached to a frame having a front part to be positioned before eyes of an user and a temple part mountable on the user's ear, connected with a side edge portion of the front part. In particular, the disclosed feature relates to the head mounted display device, in which the image display unit is detachably attached to a front edge portion of the temple part.

2. Description of the Related Art

Various head mounted display devices (hereafter HMD) have been commercialized as portable displays for TV games and personal digital assistances. For example, in Japanese Unexamined Patent Application Publication No. 2007-148131 (hereafter JP 2007-148131), an eyeglass type HMD is disclosed as an example of HMD. In the eyeglass type HMD, an image display unit is disposed in front of a frame of the eyeglass type HMD such that the image display unit is adjustable in a right-and-left direction. Particularly, an adopter member, in which a permanent magnet is embedded, is detachably disposed in the upper edges of both a left rim and a right rim that support lens of the eyeglass type HMD. A rail is fixed to the adopter member by the permanent magnet, and a retaining shaft is movably disposed in the rail. The image display unit is fixed to the frame via a holding ring. The holding ring surrounds the image display unit and is fixed to the retaining shaft by a screw nut.

In U.S. Pat. No. 6,204,974 (hereafter U.S. Pat. No. 6,204,974), another eyeglass type HMD is disclosed. In the eyeglass type HMD, a housing assembly for housing an image display unit is retained in a temple of a frame of the eyeglass type HMD by a clamp assembly that includes a mounting fixture and a clamp. In detail, a pair of pins extend from the mounting fixture that is retained in the housing assembly. The pair of pins penetrate the temple from the outside of the temple, and the housing assembly is retained in the temple at a rearward position apart from a connection part connecting the temple and a front supporting eyeglass lenses.

In U.S. Pat. No. 4,869,575 (hereafter U.S. Pat. No. 4,869,575), there is disclosed an eyeglass type HMD similar to the eyeglass type HMD disclosed in U.S. Pat. No. 6,204,974. In the eyeglass type HMD, an eyeglass frame has a front supporting eyeglass lenses, a pair of connection parts fixed in both sides of the front, and a pair of temples rotatably mounted on both connection parts. A clip type mounting means has an arm and is detachably attached to one of the temples. A display unit having a screen is mounted on a front edge portion of the arm.

SUMMARY OF THE DISCLOSURE

In the eyeglass type HMD disclosed in JP 2007-148131, the image display unit is retained in the frame by retaining means such as the retaining shaft that extends downward from the upper edges of the left rim and the right rim. The retaining means such as the retaining shaft would interrupt a user's front view when the user's view moves from images, displayed on the image display unit, to a large display or document in front of the user. In the eyeglass type HMD disclosed in U.S. Pat. No. 6,204,974, the housing assembly is retained in the temple at a rearward position apart from the connection part. Likewise, in the eyeglass type HMD disclosed in U.S. Pat. No. 4,869,575, the clip type mounting means is attached in the temple at a rearward position apart from a rotation position where the temple is rotatably mounted on the connection part. Generally, when the frame is mounted on the user, the temple would deform according to the shape of the user's head. The deformation of the temple may shift the position of images displayed on the image display unit. In the eyeglass type HMDs disclosed in U.S. Pat. Nos. 6,204,974 and 4,869,575, required is adjustment of the position of displayed images according to the deformation of the temple.

A need has arisen for the eyeglass type HMD that allows for clearing the user's front view and for suppressing an effect on a position of the image display unit by the deformation of the temple.

According to an aspect of the present invention, a head mounted display device comprises a frame, an image display unit, an extension member, and a retaining mechanism. The frame includes a front part, a connection part, and a temple part. The front part is mountable on a user's nose and extends in a right-and-left direction in front of the user's eye. The connection part is fixed to at least one edge portion of right and left side edges of the front part and extends in a rearward direction from the one edge portion. The temple part is mountable on the user's ear and rotatably connected with the connection part around a rotation axis extending along an up-and-down direction. The image display unit includes an optical system and is configured to generate an image to be displayed for the user. The extension member extends in a forward direction from the one edge portion. The retaining mechanism is configured to retain the image display unit detachably in the extension member.

According to another aspect of the present invention, a mounting device is utilized for an image display unit having an optical system to generate an image to be displayed for a user. The mounting device comprises a frame, an extension member, and a retaining mechanism. The frame includes a front part, a connection part, and a temple part. The front part is mountable on the user's nose and extends in a right-and-left direction in front of the user's eye. The connection part is fixed to at least one edge portion of right and left side edges of the front part and extends in a rearward direction from the one edge portion. The temple part is mountable on the user's ear and rotatably connected with the connection part around a rotation axis extending along an up-and-down direction. The extension member extends in a forward direction from the one edge portion. The retaining mechanism is configured to retain the image display unit detachably in the extension member.

Other objects, features, and advantages will be apparent to those skilled in the art from the following detailed description and accompanying drawings.

BRIEF DESCRIPTION OF THE DRAWINGS

An embodiment of an eyeglass type HMD are described with reference to the accompanying drawings, which are given by way of example only, and are not intended to limit the present invention.

FIG. 1 is a schematic perspective view of a frame 10 mounted on a user according to the embodiment.

FIG. 7 is a partially cross-sectional view that shows a connection part 30A, a temple body 42A, and an extension member 51A enlarged in a disassembled state.

FIG. 8A is a cross-sectional view of a front part 20 taken along the line A-A in FIG. 4.

FIG. 15A is a left side view of a disk member 64 of the attachment instrument 60. FIG. 15B is a plan view of the disk member 64. FIG. 15C is a right side view of the disk member 64.

DESCRIPTION OF THE EMBODIMENT

Embodiment

An embodiment, and its features and advantages, may be understood by referring to FIGS. 1-22, like numerals being used for corresponding parts in the various drawings. In the embodiment, a retinal scanning display (hereafter RSD) is used as an image display unit. RSD usually includes a light source and a light scanner. The light source, e.g., RGB lasers, emit image light according to image signals. The light scanner, e.g., a galvano mirror, two-dimensionally scans the image light to project an image on a user's retina. Since the structure and operation of RSD are well known (see e.g., U.S. Pat. No. 7,234,813), we omit detailed explanation of the internal structure of RSD.

<<External Entire Structure>>

Figure 2:
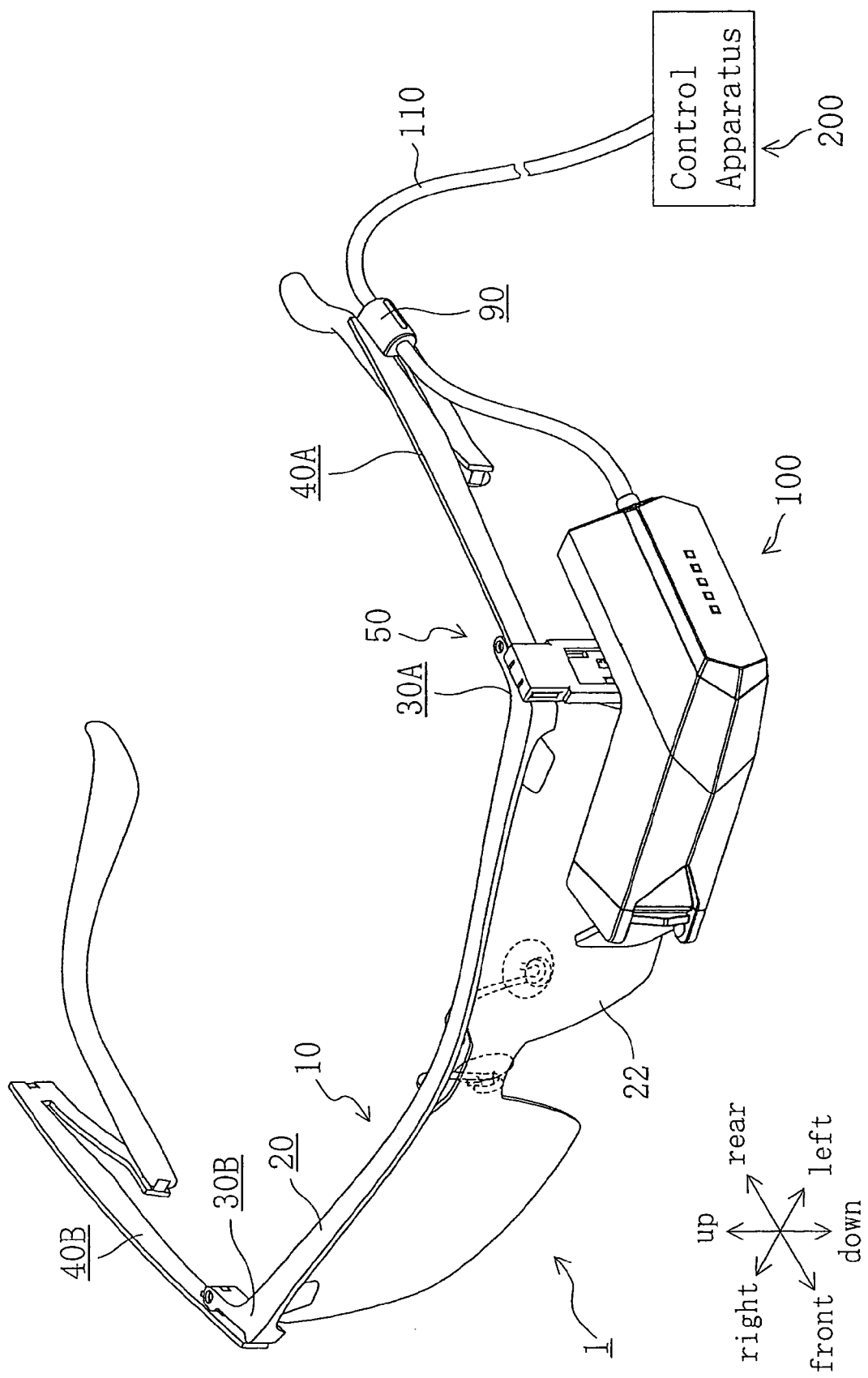
FIG. 2 is a perspective view of entire structure of a HMD 1 according to the embodiment.

Referring to FIGS. 1-2, we explain the entire structure of HMD 1. HMD 1 includes an eyeglass type frame 10 (hereafter frame 10), a retaining mechanism 50, an image display unit 100 retained on the frame 10 by the retaining mechanism 50, and a control apparatus 200 as an example of an external apparatus for supplying signals to the image display unit 100. The control apparatus 200 is connected to the image display unit 100 via a cable 110. In this embodiment and the drawings above, an up-and-down direction, a front-and-rear direction, and a right-and-left direction are based on the user in FIG. 1. These directions are also shown in FIG. 1 with arrows.

<Structure of Frame>

Figure 3:
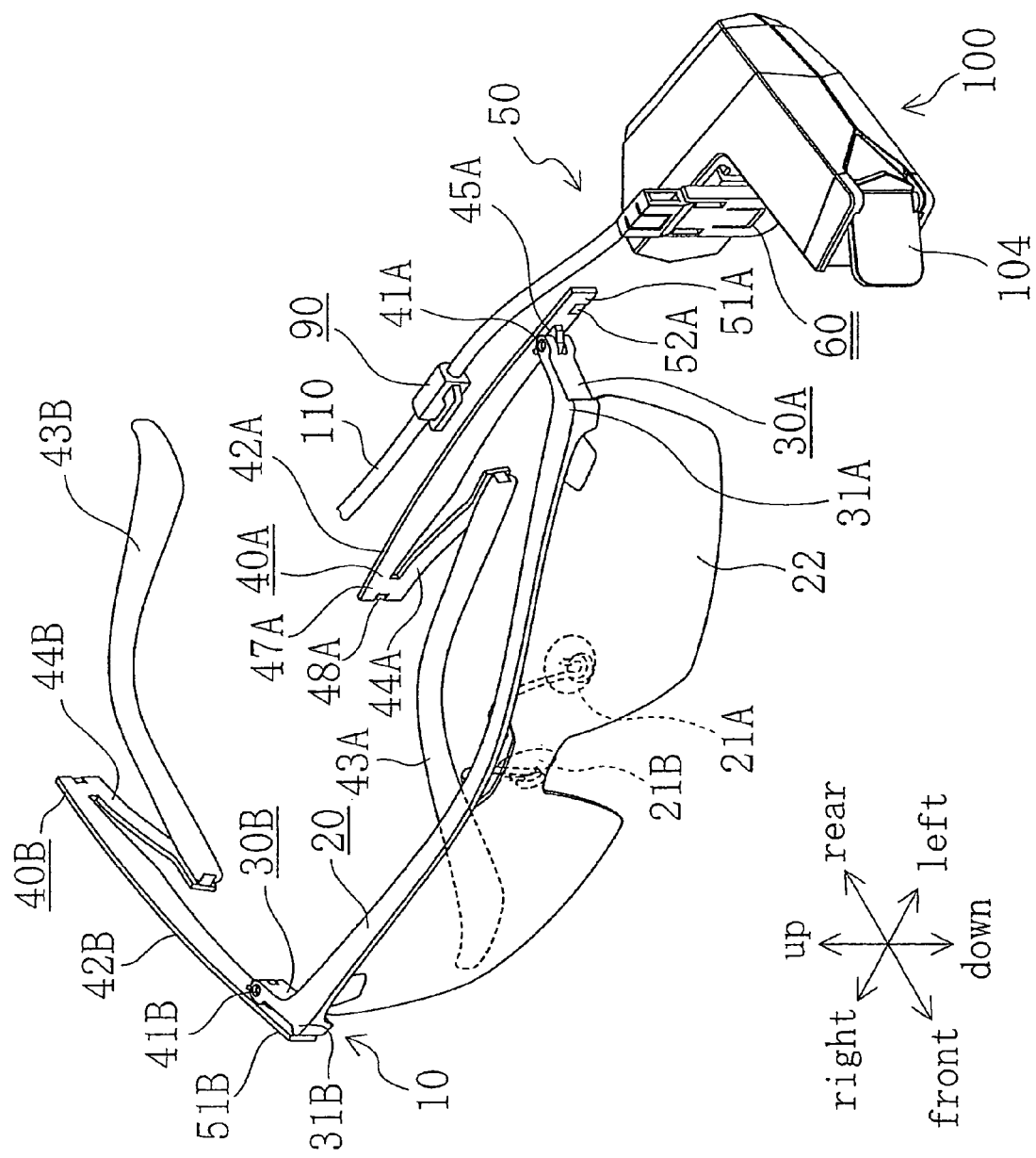
FIG. 3 is a perspective view that shows a state in which an image display unit 100 is detached from the frame 10.

Referring to FIGS. 3-6, we explain the structure of the frame 10. In FIG. 3, the frame 10 includes a front part 20, a pair of left and right connection parts 30A and 30B, and a pair of left and right temple parts 40A and 40B.

(Structure of Front Part)

Figure 4:
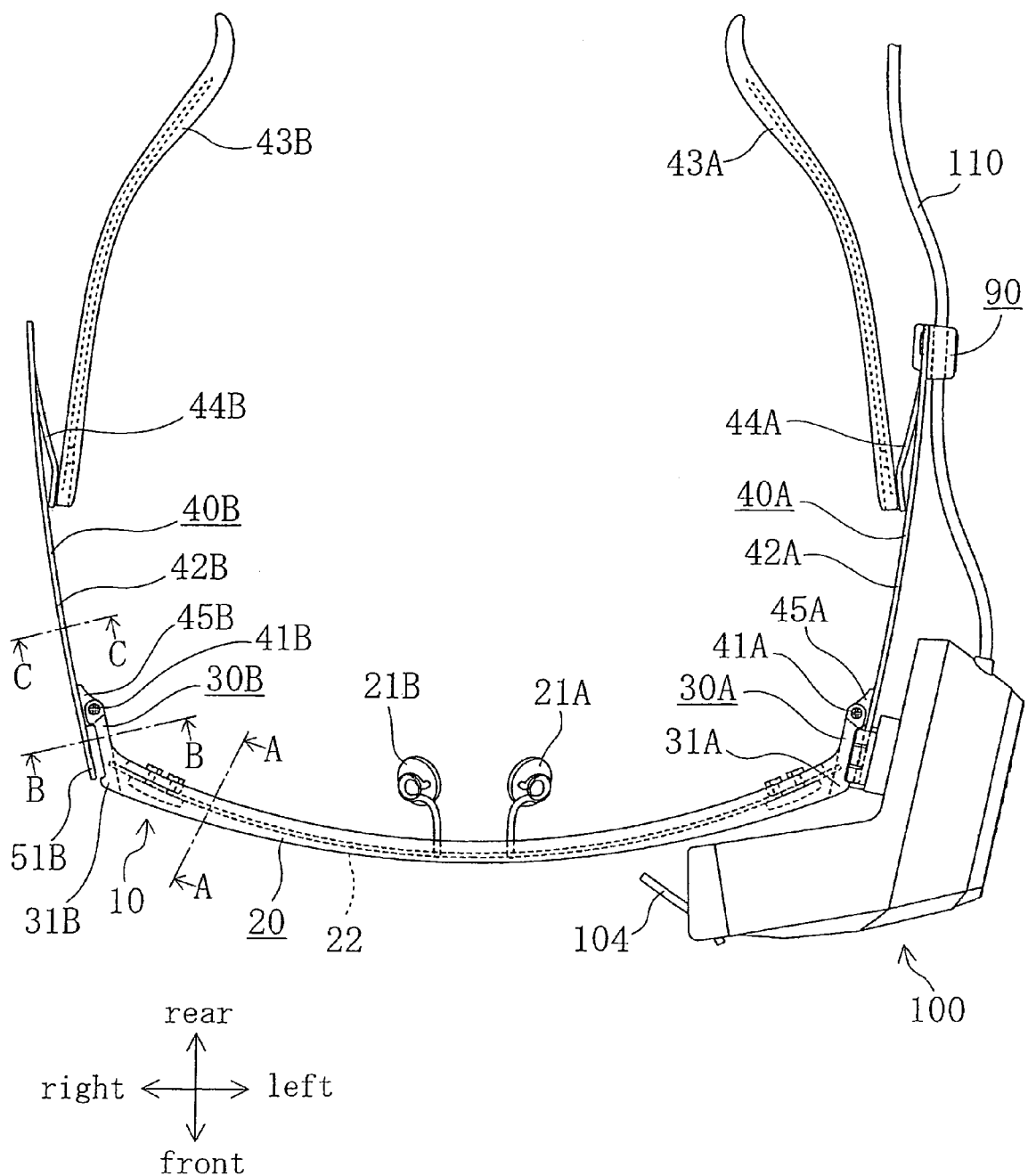
FIG. 4 is a plan view of entire structure of the frame 10 with the image display unit 100 attached.
Figure 5:
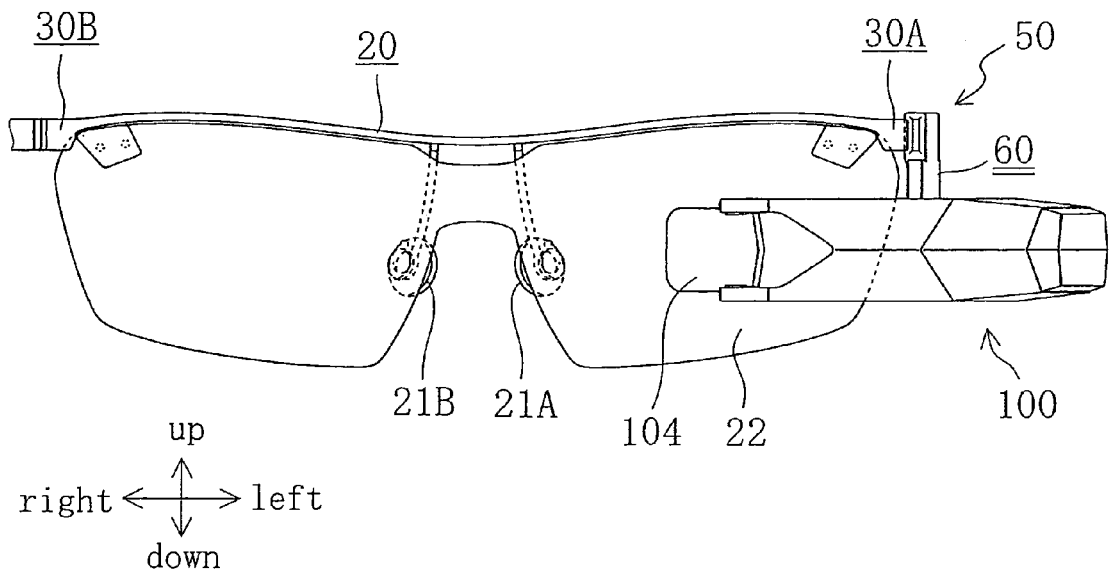
FIG. 5 is a front view of the frame 10 shown in FIG. 4.

The front part 20, mounted on the user as shown in FIG. 1, extends in the right-and-left direction. A pair of nose mounting parts 21A and 21B are fixed to a central portion of the front part 20 as shown in FIG. 4. The nose mounting parts 21A and 21B are mounted on the use's nose when the frame 10 is mounted on the user. A protective cover 22 is fixed to a lower portion of the front part 20, and is disposed to cover the user's eyes when the frame 10 is mounted on the user as shown in FIG. 1. The protective cover 22 is formed from a transparent film of a synthetic resin to prevent a part of the image display unit 100 from touching the user's eye.

(Structure of Connection Part)

As shown in FIG. 4, the connection parts 30A and 30B are fixed to left and right side edges of the front part 20, respectively. The connection parts 30A and 30B extend in a rearward direction at an angle such that they open to the right-and-left direction. The connection parts 30A and 30B are integrally formed with the front part 20. The temple parts 40A and 40B are rotatably connected with the connection parts 30A and 30B with mounting screws 41A and 41B, which extend in the up-and-down direction, respectively. Namely, the temple parts 40A and 40B are rotatable around rotation axes that extend in the up-and-down direction of the mounting screws 41A and 41B, respectively. Forward portions 31A and 31B of the connection parts 30A and 30B are formed to protrude outside of the connection parts 30A and 30B.

(Structure of Temple Part)

The temple parts 40A and 40B include temple bodies 42A and 42B, ear mounting parts 43A and 43B, and auxiliary guide members 44A and 44B, respectively. The temple bodies 42A and 42B include connection portions 45A and 45B for rotatably connecting the temple bodies with rear end portions of the connection parts 30A and 30B. The auxiliary guide member 44A and 44B connect the temple bodies 42A and 42B with the ear mounting parts 43A and 43B. Since both the connection parts 30A and 30B, and both the temple parts 40A and 40B are symmetric in their structure, we explain the left side connection part 30A and the left side temple part 40A, referring to FIG. 4, FIG. 6 and FIG. 7.

Figure 6:
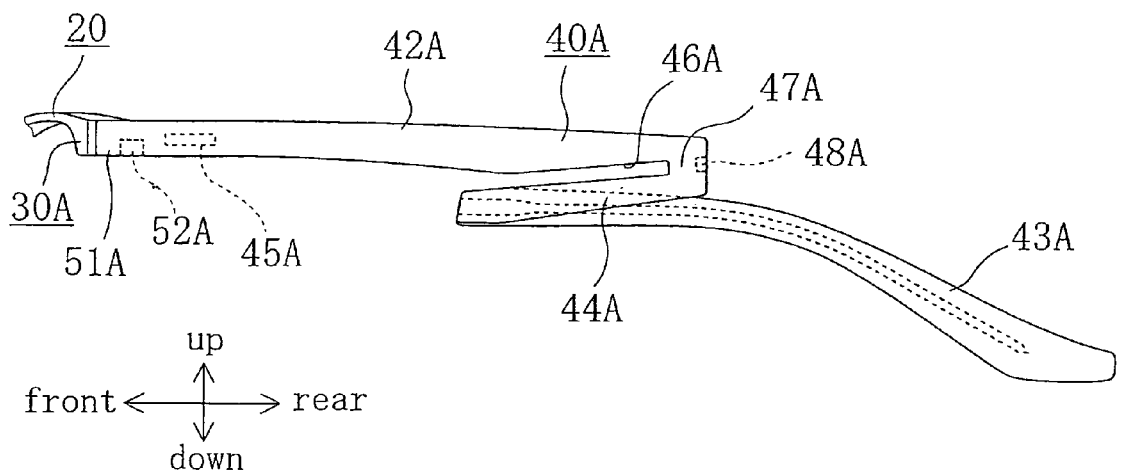
FIG. 6 is a left side view of the frame 10 with the image display unit 100 detached.

The temple body 42A is rotatably connected with the rear end portion of the connection part 30A with the mounting screw 41A. The temple body 42A straightly extends in the front-and-rear direction. As shown in FIG. 6, the auxiliary guide member 44A is connected with a rear end portion of the temple body 42A, and extends forward along the temple body 42A under the temple body. The auxiliary guide member 44A is disposed at a given distance from the temple body 42A. As shown in FIG. 4, a forward portion of the auxiliary guide member 44A is curved toward the inside of the frame 20. A front end of the forward portion of the auxiliary guide member 44A is bent toward the outside of the frame 20. A slide aperture 46A is formed from a space between the temple body 42A and the auxiliary guide member 44A. The slide aperture 46A is opened at its front end. A closure portion 47A is formed at a position where the temple body 42A and the auxiliary guide member 44A are connected. The closure portion 47A closes a rear end of the slide aperture 46A. As shown in FIG. 3, a holding groove 48A is formed at a rear end of the closure portion 47A. The slide aperture 46A slopes down in a front direction. A space of the opened end of the slide aperture 46A in a up-and-down direction is set to be larger than a space of the closed end of the slide aperture 46A near to the closure portion 47A. A cable holding clip 90 described hereinafter can slide along the slide aperture 46A, and is formed to fit to the holding groove 48A.

In FIG. 4, the ear mounting part 43A is fixed to the front bent end of the auxiliary guide member 44A, and extends rearward with curving toward the inside of the frame 10. In FIG. 6, the ear mounting part 43A is disposed under the temple body 42A. When the user mounts the frame 10 with usually wearing eyeglasses for adjusting sight, the front part 20 and the temple body 42A of the frame 10 is placed above a front part and a temple part of a frame of the eyeglasses worn by the user, because of such disposition of the ear mounting part 43A under the temple body 42A. Therefore, the user can easily mount the frame 10 without interfering with the front part and the temple part of the eyeglass frame.

Referring to FIG. 7, we explain a structure for connecting the connection part 30A and the temple part 40A. The connection portion 45A is formed to protrude from a right side surface of the temple body 42A, and has a hole into which the mounting screw 41A is inserted. The connection portion 45A has a planar surface 45A-1 vertical to the right side surface of the temple body 42A, an inclined planar surface 45A-2 sloped rearward from the vertical planar surface 45A-1, and a curved surface 45A-3 formed continuously to the inclined planar surface 45A-2. The connection part 30A includes a pair of rear end portions which hold the connection portion 45A therebetween in a up-and-down direction. In FIG. 7, one rear end portion 32A is shown with the other rear end portion severed. The rear end portion 32A has a hole into which the mounting screw 41A is inserted. The rear end portion 32A further has an inclined planar surface 32A-1 engageable with the inclined planar surface 42A-2. When the temple part 40A is rotated in a counterclockwise direction around an axis of the mounting screw 41A, the inclined planar surface 32A-1 allows the temple part 40A to be rotated without the curved surface 45A-3 interfering with the inclined planar surface 32A-1. When the temple part 40A is rotated in a clockwise direction around an axis of the mounting screw 41A, the inclined planar surface 32A-1 is engaged with the inclined planar surface 45A-2. By engagement of both inclined planar surfaces, an angular position of the temple part 40A can be determined such that the image display unit 100 is positioned in front of the user's eye, as shown in FIG. 4.

Since the ear mounting parts 43A and 43B include portions which are directly in touch with ears of the user, these portions are covered with a synthetic resin material having adequate elasticity such that the user feels soft when mounting the frame 10.

(Cross-Sectional Shape of Frame)

Figure 8B:
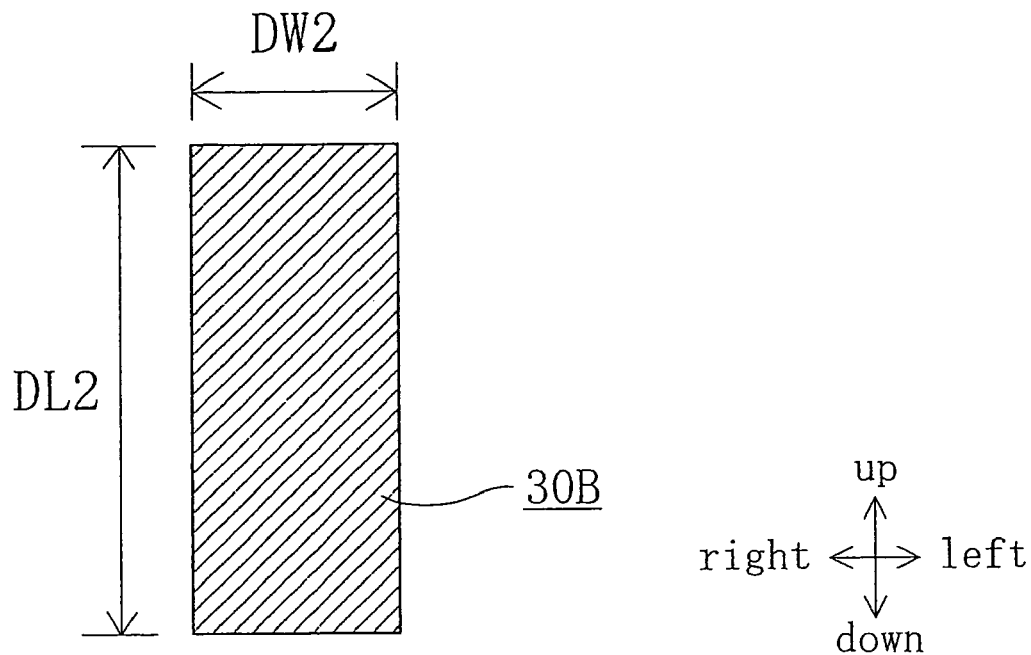
FIG. 8B is a cross-sectional view of the connection part 30B taken along the line B-B in FIG. 4.
Figure 8C:
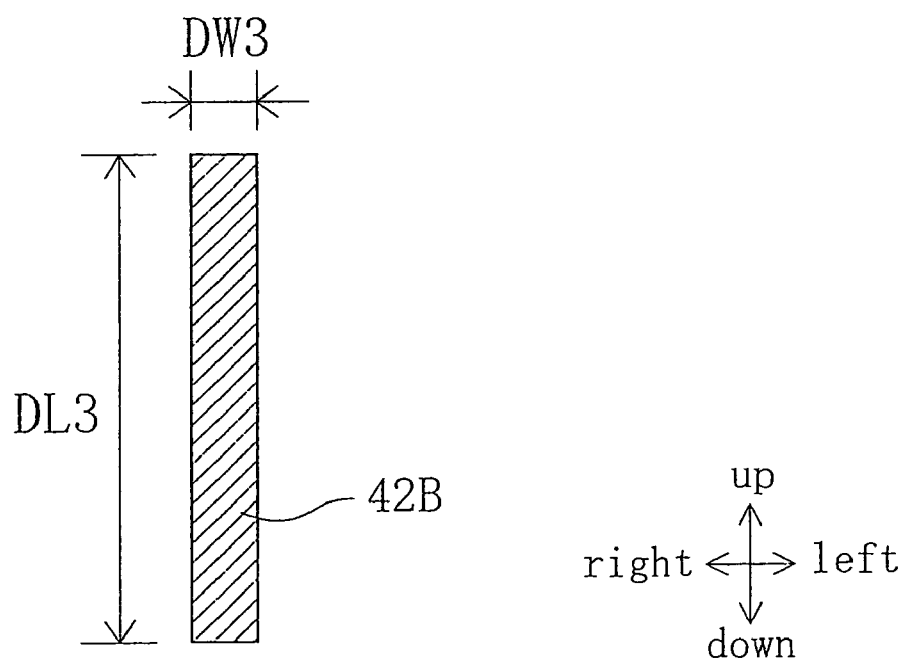
FIG. 8C is a cross-sectional view of a temple body 42B taken along the line C-C in FIG. 4.

In a cross-sectional shape of the front part 20 in a direction perpendicular to a longitudinal direction of the front part 20, a length in the front-and-rear direction, i.e., a width, is larger than a length in the up-and-down direction, i.e., a height. As shown in FIG. 8A, the width DW1 is larger than the height DL1. In cross-sectional shapes of the connection parts 30A and 30B in a direction perpendicular to a longitudinal direction of the connection parts 30A and 30B, a length in the right-and-left direction, i.e., a width is smaller than a length in the up-and-down direction, i.e., a height, whereas the width DW2 is sufficiently larger than the height DL1 of the front part 20, as shown in FIG. 8B. In cross-sectional shapes of the temple bodies 42A and 42B in a direction perpendicular to a longitudinal direction of the temple bodies 42A and 42B, a length in the right-and-left direction, i.e., a width is smaller than a length in the up-and-down direction, i.e., a height. As shown in FIG. 8C, the width DW3 is smaller than the height DL3, and is substantially equal to the height DL1 of the front part 20. Bending moments around the rotation axes of the mounting screws 41A and 41B are put on the front part 20 and the connection parts 30A and 30B when the frame 10 is mounted on the user. Since cross-sectional shapes of both the front part 20 and the connection parts 30A and 30B are larger in ratio of width to height than those of the temple bodies 42A and 42B, the deformation of the front part 20 and the connection parts 30A and 30B, caused by the bending moments, is smaller than the deformation of the temple bodies 42A and 42B.

In addition to the difference in the cross-sectional shape described above, constituent materials are also different among the front part 20, the connection parts 30A and 30B, and the temple bodies 42A and 42B. The front part 20 and the connection parts 30A and 30B are made from pure titanium, and the temple bodies 42A and 42B are made from beta titanium. Since the Young's modulus, namely longitudinal elastic modulus, of pure titanium is larger than that of beta titanium, the front part 20 and the connection parts 30A and 30B are more rigid against pull and compression forces than the temple bodies 42A and 42B, namely harder to deform. The auxiliary guide members 44A and 44B are formed integrally with the temple bodies 42A and 42B, and are made from beta titanium. Therefore, the temple bodies 42A and 42B, and the auxiliary guide member 44A and 44B are less rigid against pull and compression forces than the front part 20 and the connection parts 30A and 30B, namely easier to deform.

<Structures of Retaining Mechanism and Extension member>

A retaining mechanism 50 retains the image display unit 100 in the extension member 51A or 51B, allowing the user to choose a preferred retaining state of the image display unit 100 either in the extension member 51A or 51B. The retaining mechanism 50 includes an attachment instrument 60 as a main component.

(Structure of Extension Member)

A pair of left and right extension members 51A and 51B are formed in the temple parts 40A and 40B. Since both the extension members 51A and 51B are symmetric in their structure, we explain the left extension member 51A. In FIG. 7, the extension member 51A extends forward the connection portion 45A of the temple body 42A, and is formed integrally with the temple body 42A. The extension member 51A is made from beta titanium. A notch groove 52A is formed in a right side surface of the extension member 51A.

(Structure of Attachment Instrument)

Figure 9:
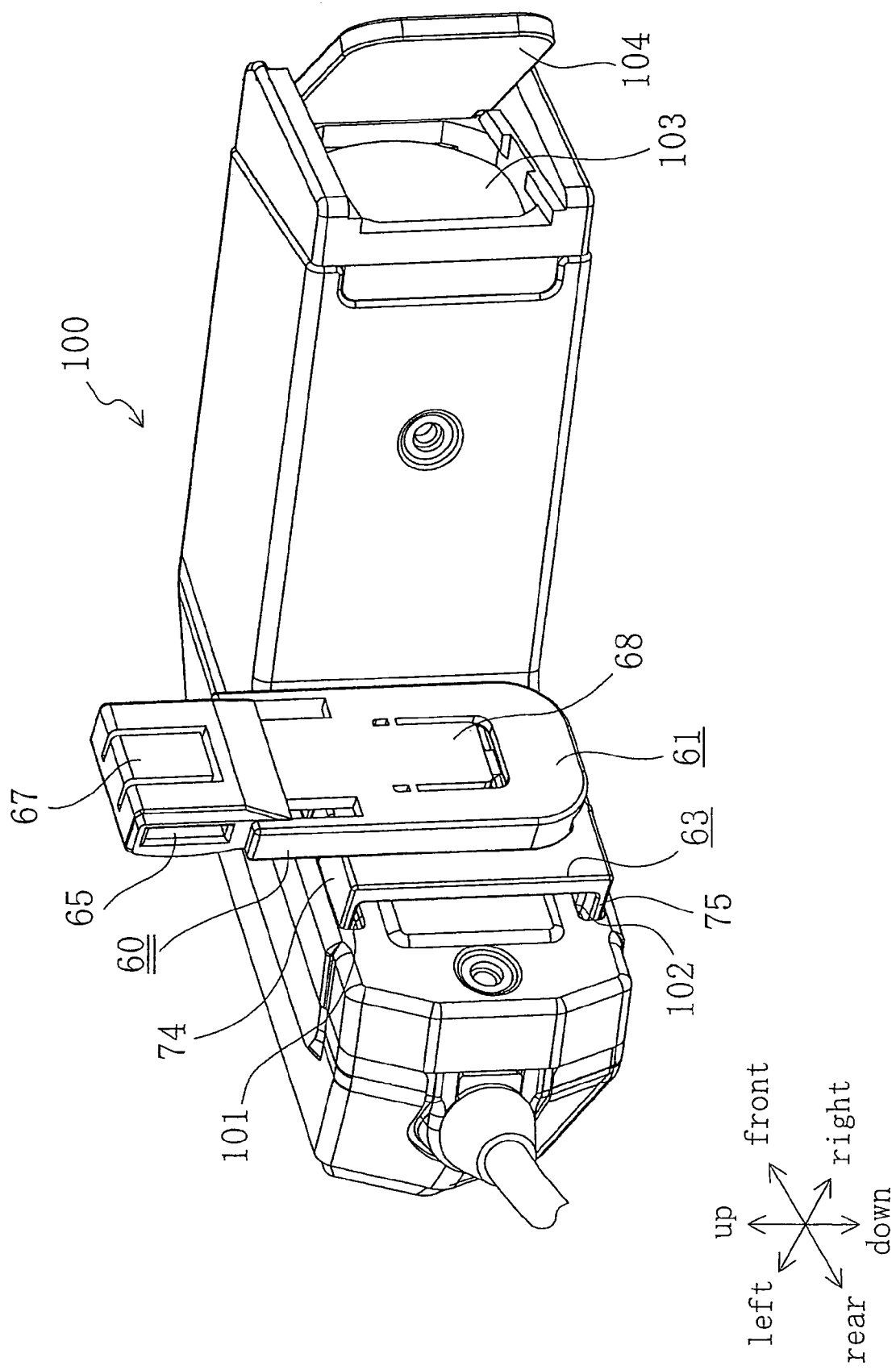
FIG. 9 is an enlarged perspective view of the image display unit 100 with an attachment instrument 60 attached.
Figure 10:
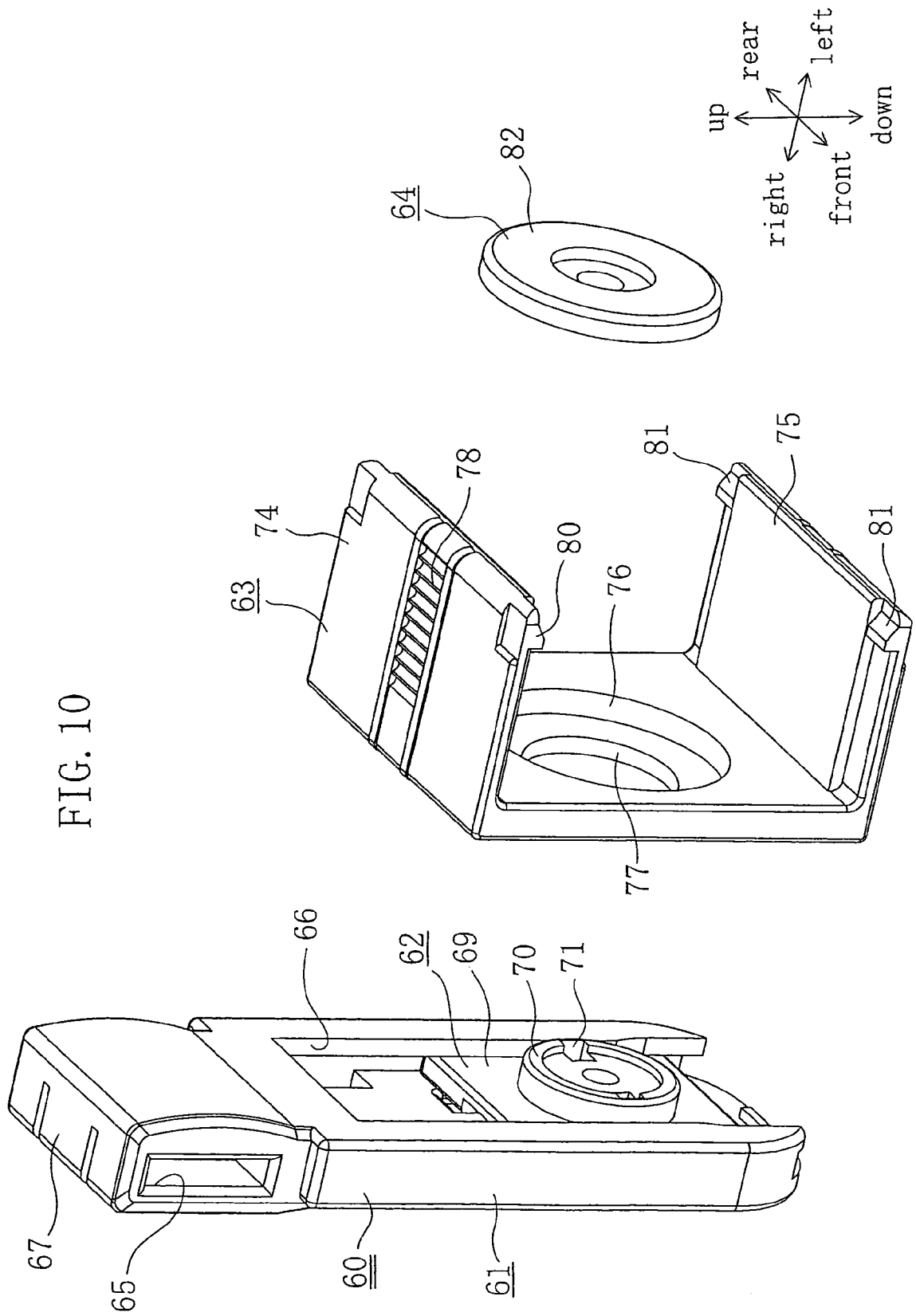
FIG. 10 is an enlarged perspective view of parts of the attachment instrument 60 in a disassembled state.

Referring to FIGS. 9-15, we explain a structure of an attachment instrument 60. In FIG. 10, the attachment instrument 60 includes an instrument body 61, a slide member 62, a slide frame 63, and a rotation disk 64 as main components. These main components are made from a synthetic resin material.

The instrument body 61 has an attachment hole 65 penetrating in the front-and-rear direction at its upper portion, and has an attachment groove 66 at its lower portion. The attachment hole 65 is formed such that a front end of each of the extension members 51A and 51B is inserted into the attachment hole 65. The attachment groove 66 is formed such that the slide member 62 fits to the attachment groove 66.

Figure 11A:
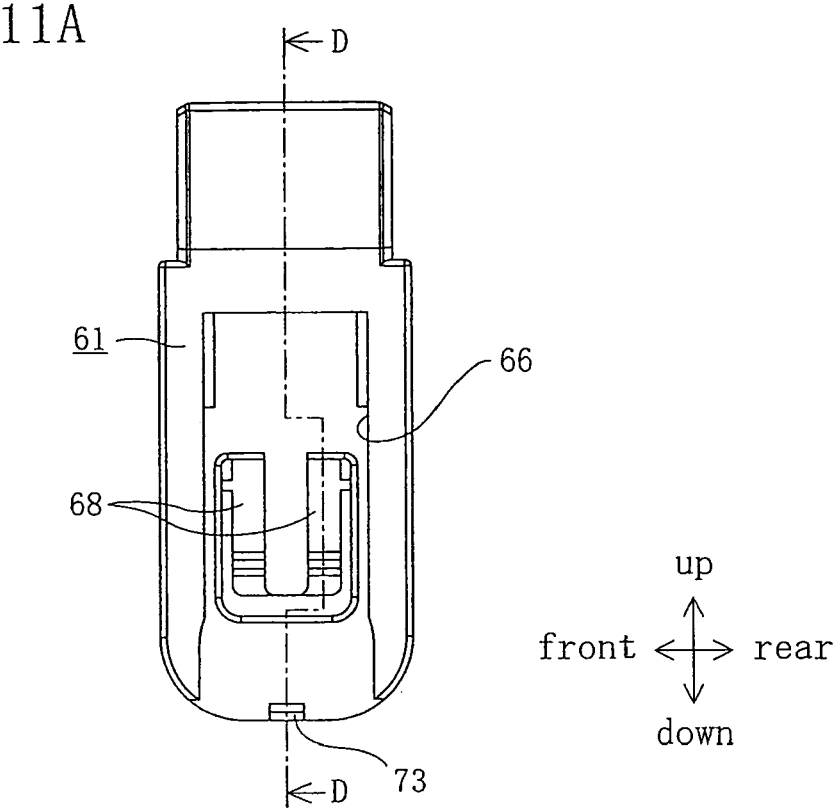
FIG. 11A is a left side view of an instrument body 61 of the attachment instrument 60.
Figure 11B:
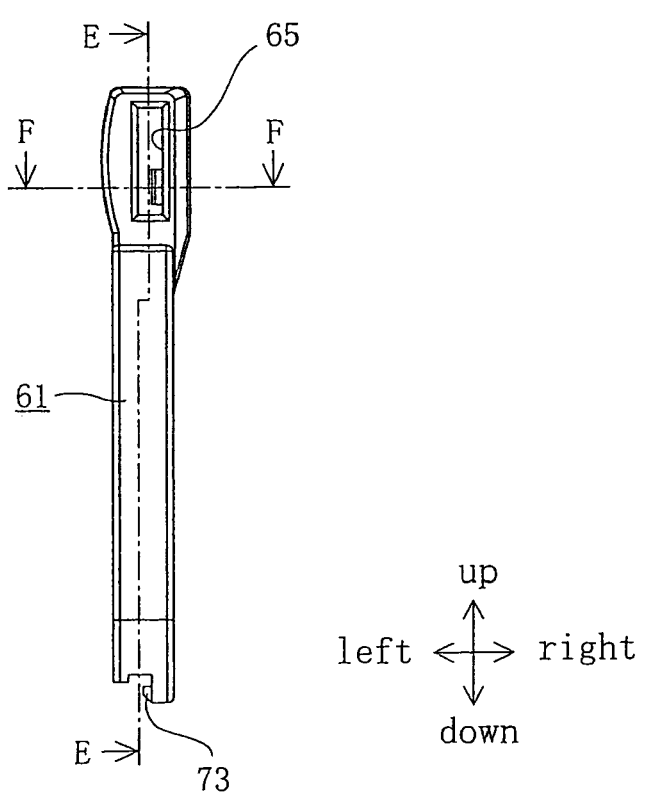
FIG. 11B is a rear view of the instrument body 61.
Figure 11C:
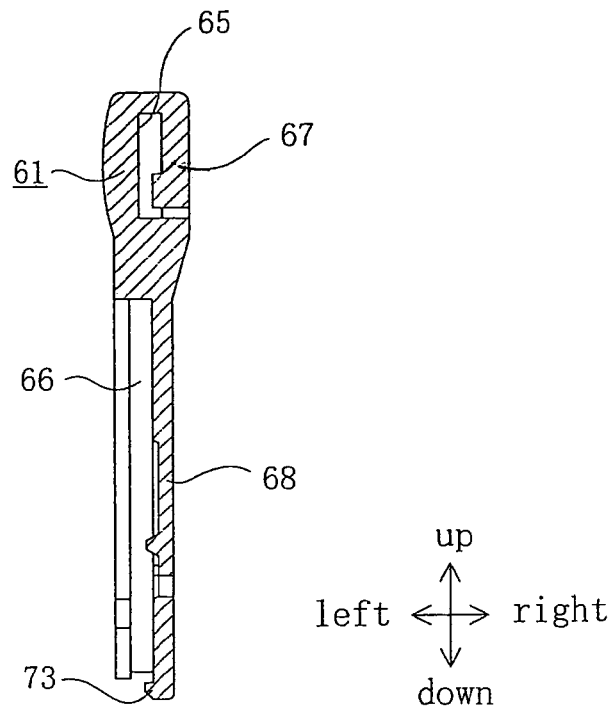
FIG. 11C is a cross-sectional view of the instrument body 61 taken along the line D-D in FIG. 11A.
Figure 11D:
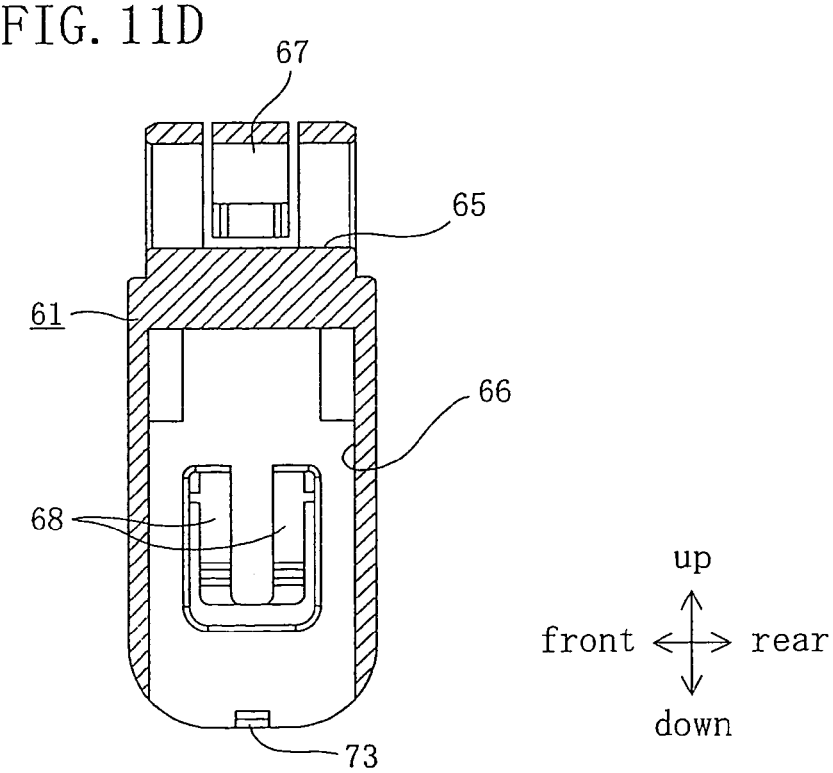
FIG. 11D is a cross-sectional view of the instrument body 61 taken along the line E-E in FIG. 11B.
Figure 12:
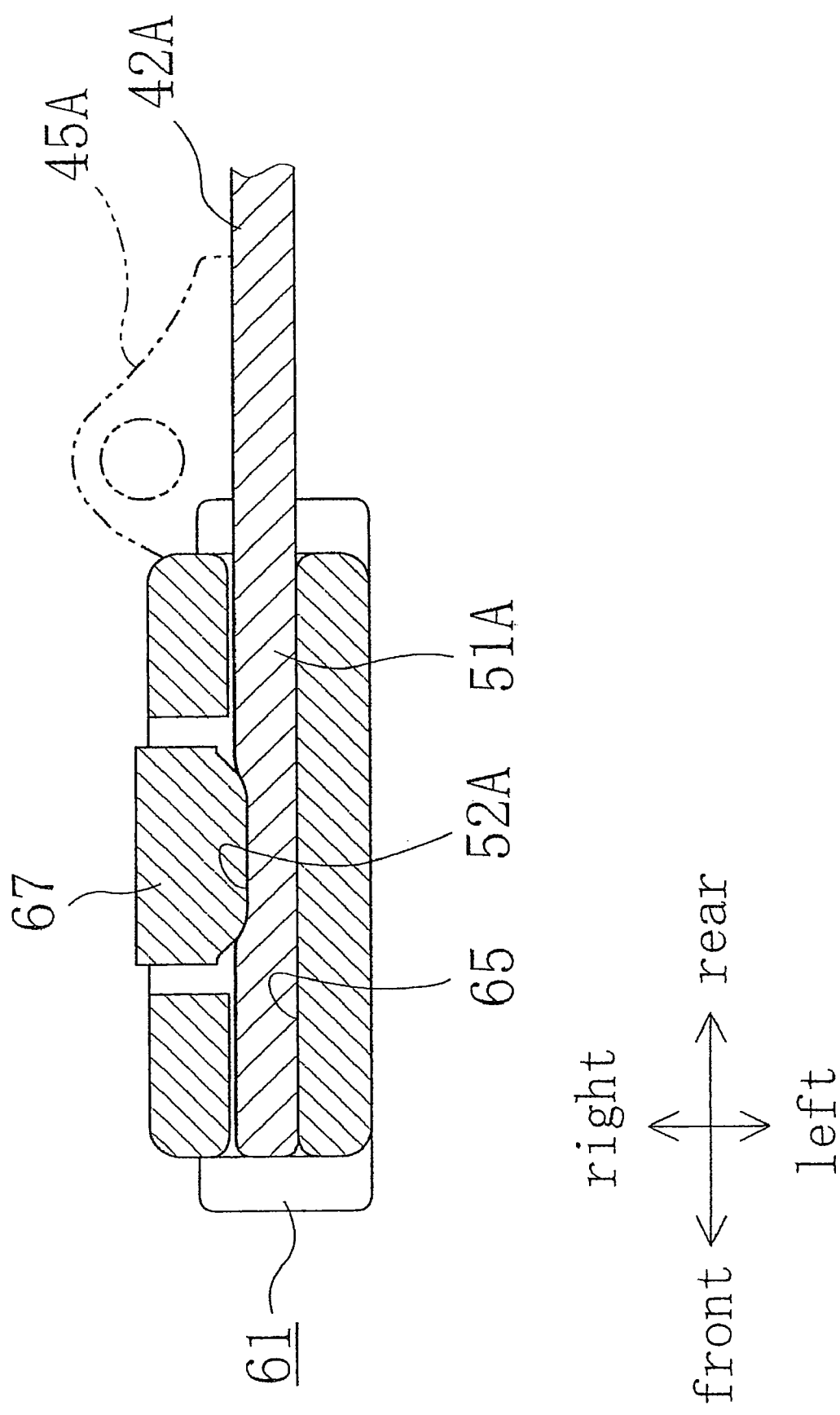
FIG. 12 is an enlarged cross-sectional view that shows a state in which a frame attachment part 67 of the instrument body 61 fits to a notch aperture 52A of the extension member 51A.

In FIG. 11C, a frame attachment part 67 is formed at an upper portion of the instrument body 61. A lower end of the frame attachment part 67 extends inside of the attachment hole 65. An unit attachment part 68 is formed at a lower portion of the instrument body 61. A lower end of the unit attachment part 68 extends inside of the attachment groove 66. In FIG. 12, the lower end of the frame attachment part 67 fits to the notch groove 52A of the extension member 51A. An elastic force of the attachment part 67 itself maintains fitting of the lower end to the notch groove 52A. When the lower end of the frame attachment part 67 fits to the notch groove 52A, a rear end surface of the instrument body 61 shown in FIG. 12 abuts onto the vertical planar surface 45A-1 of the connection portion 45A. Such abutment of the rear end surface and the vertical planar surface 45A-1 restricts rearward movement of the instrument body 61 relative to the extension member 51A. In addition, since the forward portion 31A of the connection part 30A shown in FIG. 7 protrudes just in front of a front end surface of the instrument body 61, the instrument body 61 is prevented from moving forward and then falling out of the extension member 51A, when the lower end of the frame attachment part 67 fits to the notch groove 52A.

Figure 13A:
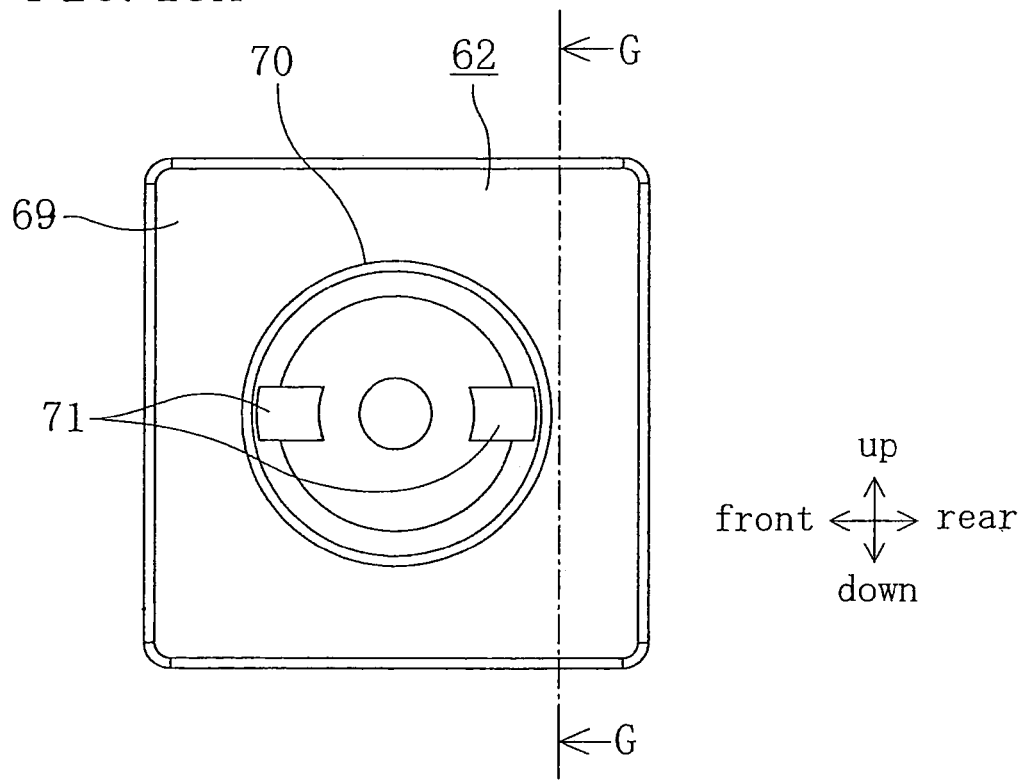
FIG. 13A is a left side view of a slide member 62 of the attachment instrument 60.
Figure 13B:
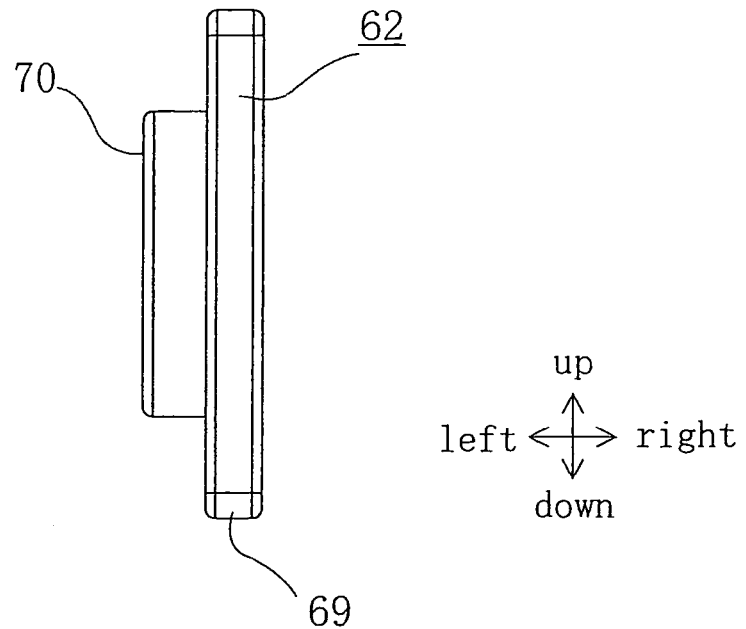
FIG. 13B is a rear view of the slide member 62.
Figure 13C:
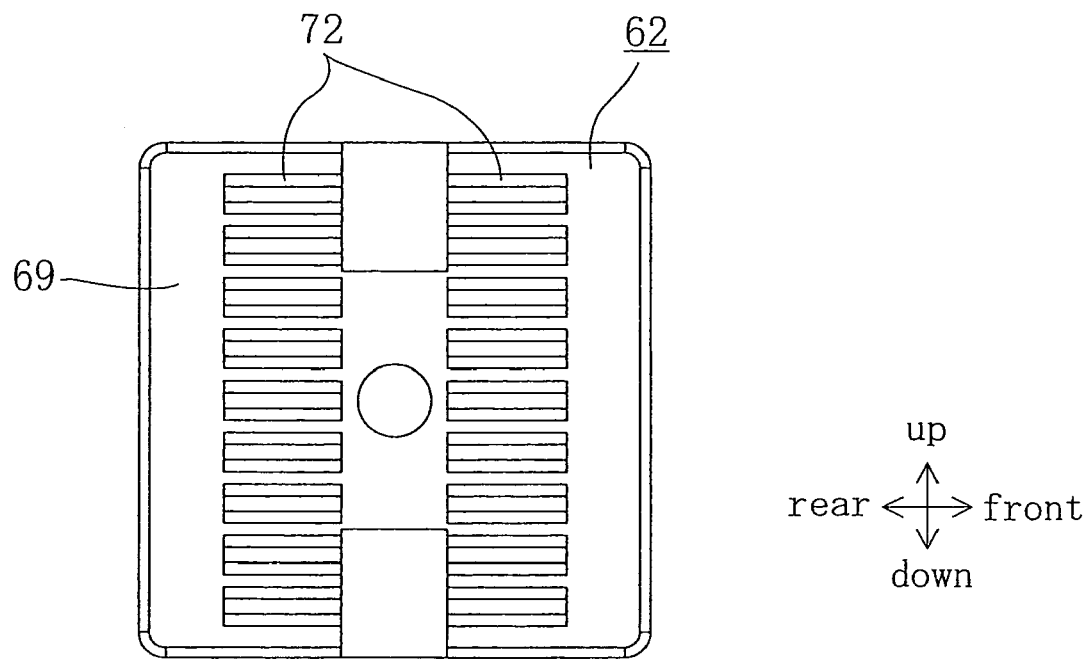
FIG. 13C is a right side view of the slide member 62.
Figure 13D:
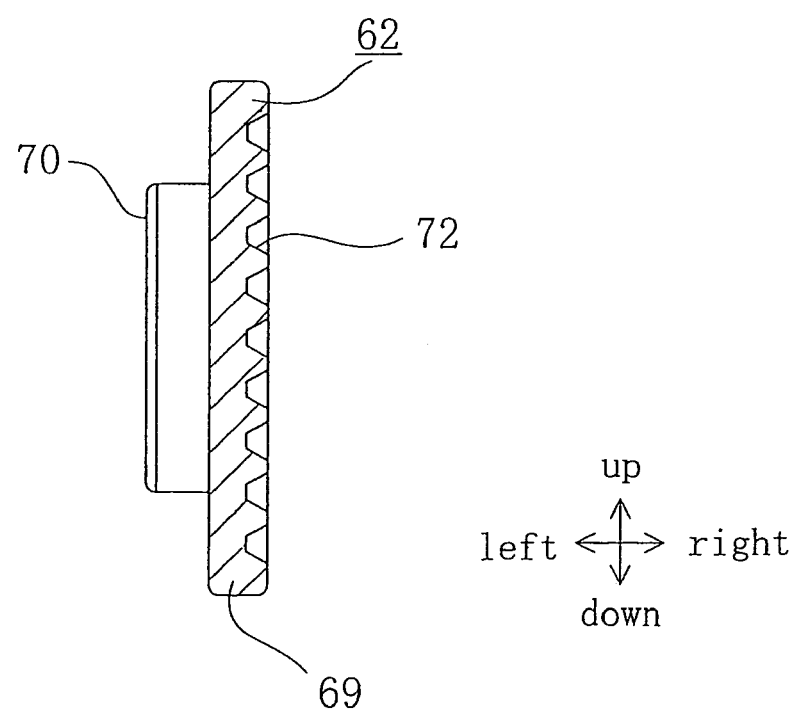
FIG. 13D is a cross-sectional view of the slide member 62 taken along the line G-G in FIG. 13A
Figure 14A:
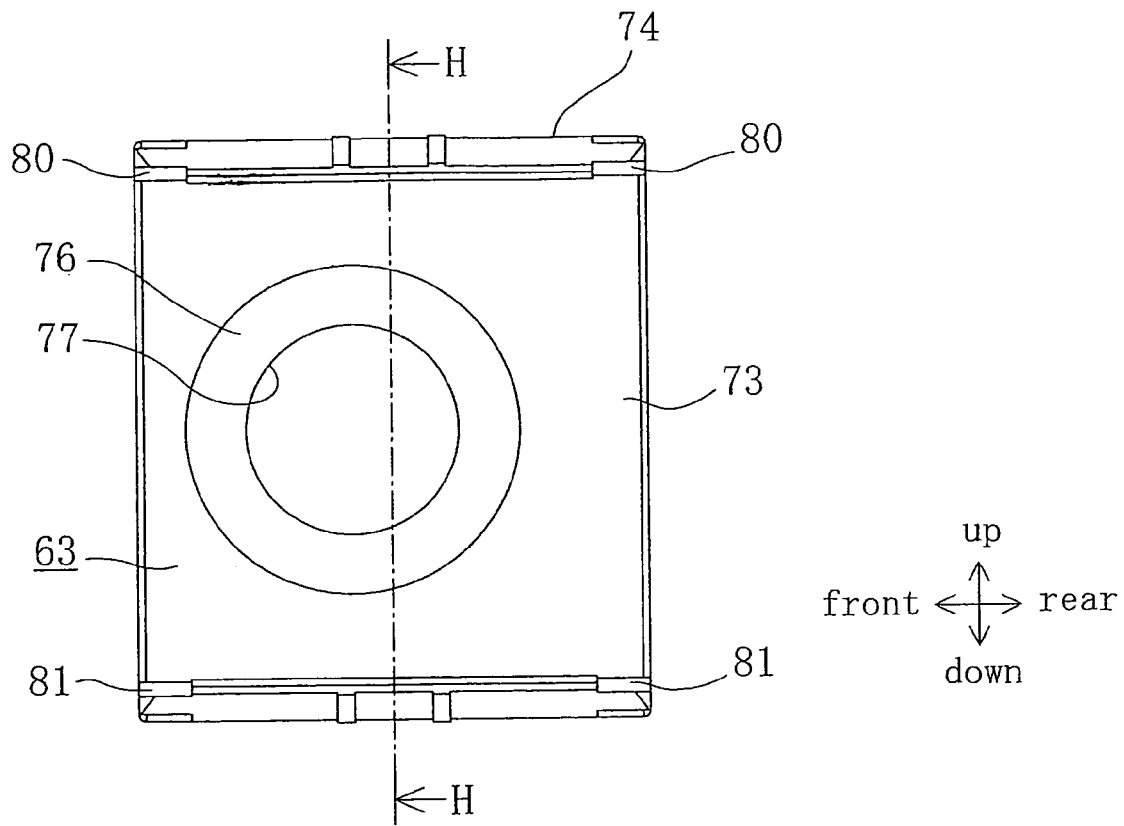
FIG. 14A is a left side view of a slide frame 63 of the attachment instrument 60.
Figure 14B:
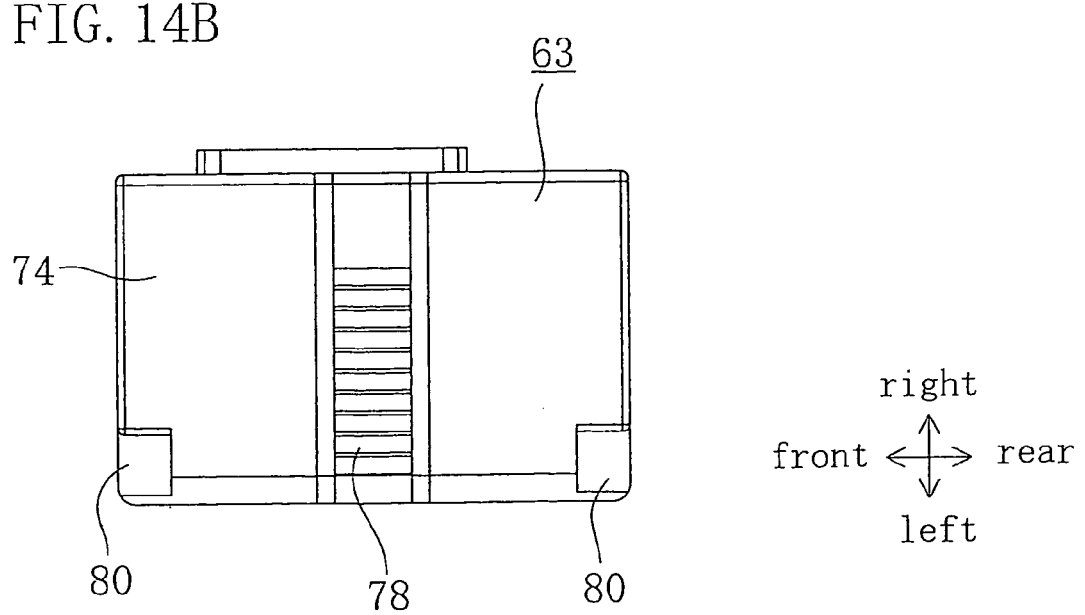
FIG. 14B is a plan view of the slide frame 63.
Figure 14C:
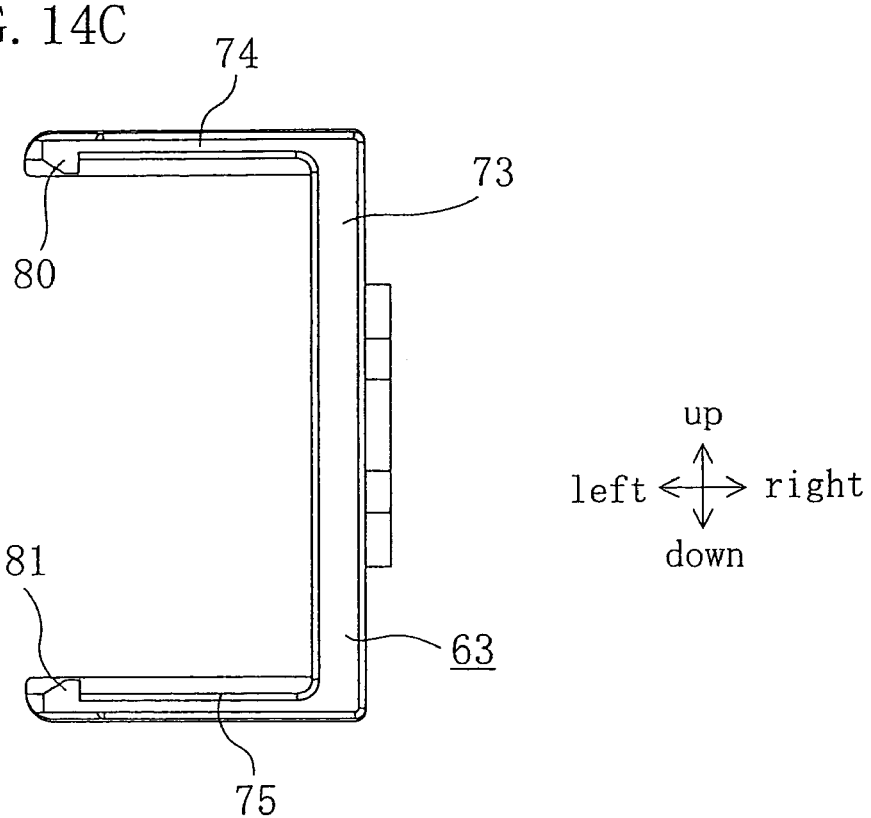
FIG. 14C is a rear view of the slide frame 63.
Figure 14D:
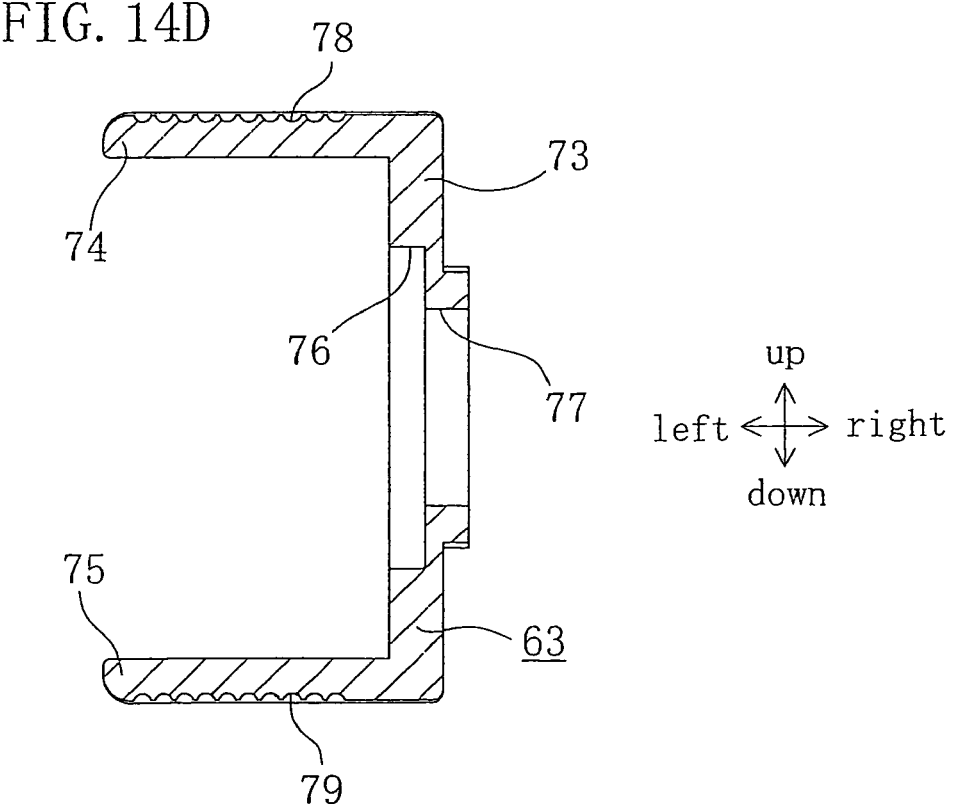
FIG. 14D is a cross-sectional view of the slide frame 63 taken along the line H-H in FIG. 14A.

In FIGS. 13A-13D, the slide member 62 includes a rectangular platelike slide portion 69 and a circular protrusion 70. The circular protrusion 70 is formed to protrude from one side surface of the platelike slide portion. A pair of holding grooves 71 and 71 are formed inside of the circular protrusion 70. As shown in FIG. 13C, two rows of multiple engagement grooves 72 are formed in the up-and-down direction in the other side surface of the platelike slide portion 69. In a state where the slide member 62 is mounted by fitting to the attachment groove 66, the unit attachment part 68 of the instrument body 61 is engaged with the engagement groove 72 of the slide member 62 by elasticity of the unit attachment part 68 itself, thereby retaining the engagement position of the slide member 62 with the engagement groove 72, namely a position of the slide member 62 in the up-and-down direction. A projection 73 is formed to protrude toward the inside of the attachment groove 66 in a lower edge portion of the instrument body 61. The projection 73 prevents the slide member 62 fitting to the attachment groove 66 from falling out of the attachment groove 66. The user releases the slide member 62 from engagement with the projection 73 by elastically deforming a lower edge portion of the instrument body 61 in which the projection 73 is formed, when removing the slide member 62 from the attachment groove 66.

In FIGS. 14A-14D, the slide frame 63 includes a platelike support portion 73, and an upper arm portion 74 and a lower arm portion 75, which extend horizontally from upper and lower ends of the support portion 73. The support portion 73 has a circular fitting recess 76, and a circular fitting hole 77. The fitting hole 77 is disposed inside of the fitting recess 76 and is formed to fit to an exterior peripheral surface of the circular protrusion 70. An angular position of the slide frame 63 relative to the slide member 62 can be changed around a center of the circular protrusion 70, namely an axis extending in the left-and-right direction, by fitting the circular protrusion 70 to the fitting hole 77. One row of multiple upper engagement grooves 78 are formed in an upper surface of the upper arm portion 74 to extend in the left-and-right direction. In addition, one row of multiple lower engagement grooves 79 are formed in an lower surface of the lower arm portion 75 to extend in the left-and-right direction. In FIG. 9, the upper arm portion 74 and the lower arm portion 75 are formed to fit to an upper attachment hole 101 and a lower attachment hole 102 disposed in a right side surface of the image display unit 100. When both arm portions 74 and 75 fit to both attachment hole 101 and 102, both engagement grooves 78 and 79 are elastically engaged with a pair of upper and lower resilient parts, not shown, disposed inside of the image display unit 100. The upper and lower resilient parts are similar in structure to a resilient part such as the frame attachment part 67 and the unit attachment part 68. Both engagement grooves 78 and 79 retain an attachment position of the image display unit 100 relative to the slide frame 63, namely a position in the left-and-right direction, by engagement with the upper and lower resilient parts. A pair of upper projection portions 80 and 80 are disposed at front and rear corners of a left side end of the upper arm portion 74. A pair of lower projection portions 81 and 81 are disposed at front and rear corners of a left side end of the lower arm portion 75. Both projection portions 80 and 81 are engageable with engagement members disposed in the vicinity of both attachment holes 101 and 102, in order to prevent both arm portions 74 and 75 from falling out of both attachment holes 101 and 102. The user releases both projection portions 80 and 81 from engagement with the engagement members, by elastically deforming the projection portions 80 and 81.

In FIGS. 15A-15C, a rotation disk 64 includes a disk portion 82 and a pair of holding projections 83 and 83 protruding from one side surface of the disk portion 82. The disk portion 82 is formed to fit to an interior peripheral surface of the circular fitting recess 76 of the slide frame 63. Both holding projections 83 and 83 are inserted under pressure into both holding grooves 71 and 71 of the slide member 62 through the fitting hole 77. By such insertion under pressure, one side surface of the disk portion 82, in which both holding projections 83 and 83 are formed, is pressed to come into frictional contact with a bottom surface of the fitting recess 76 of the slide frame 63, namely a right side surface of the fitting recess 76 shown in FIG. 14D. An angular position of the slide frame 63 relative to the slide member 62 can be changed, and the angular position can be maintained by frictional resistance of such contact between both surfaces.

The attachment instrument 60 of the present embodiment includes the instrument body 61, the slide member 62, the slide frame 63, and the rotation disk 64. Owing to such structure of the attachment instrument 60, a position of the image display unit 100 relative to the left side extension member 51A can be adjusted both in the up-and-down direction and in the left-and-right direction. In addition, an angular position of the image display unit 100 can be changed around the circular protrusion 70. That is to say, an angular position of the image display unit 100 can be changed around an axis in the left-and-right direction in which a center line of the circular protrusion 70 extends. The axis in the left-and-right direction is perpendicular to the front-and-rear direction which the extension member 51A extends, and is perpendicular to the up-and-down direction which the mounting screw 41A extends. The attachment instrument 60 can be attached to the right side extension member 51A with the angular position of the image display unit 100 changed 180 degrees. Likewise, the angular position of the image display unit 100 relative to the right side extension member 51A can be adjusted.

<Structure of Cable Holding Clip>

Figure 16:
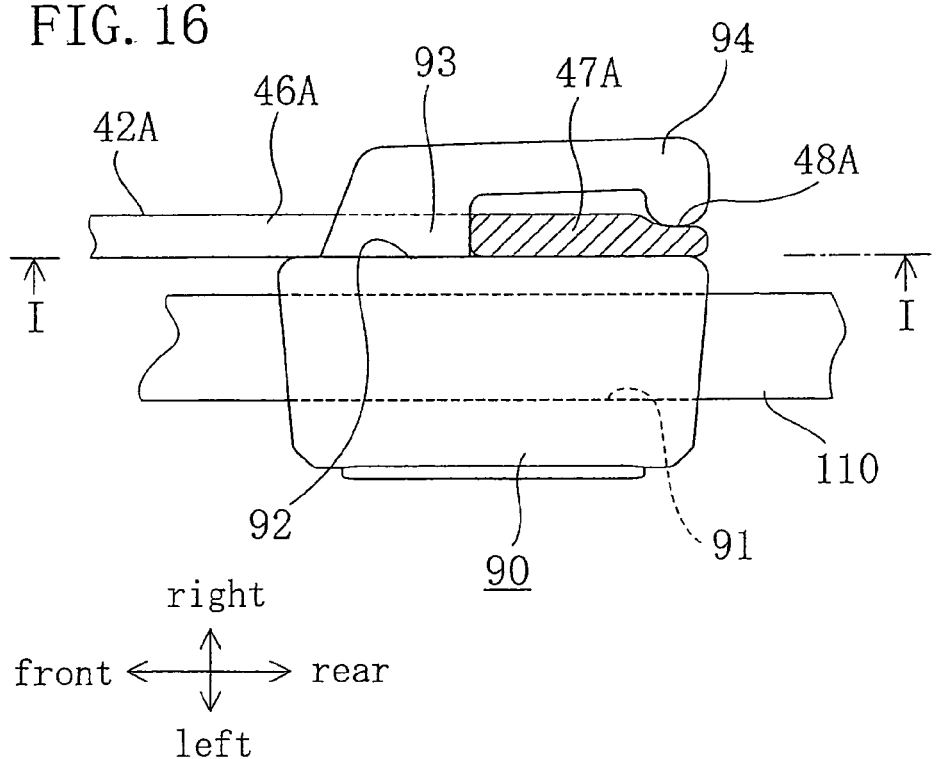
FIG. 16 is a partially cross-sectional view that shows a state in which a holding arm 94 of a cable holding clip 90 fits to a holding aperture 48A of a closure portion 47A.
Figure 17:
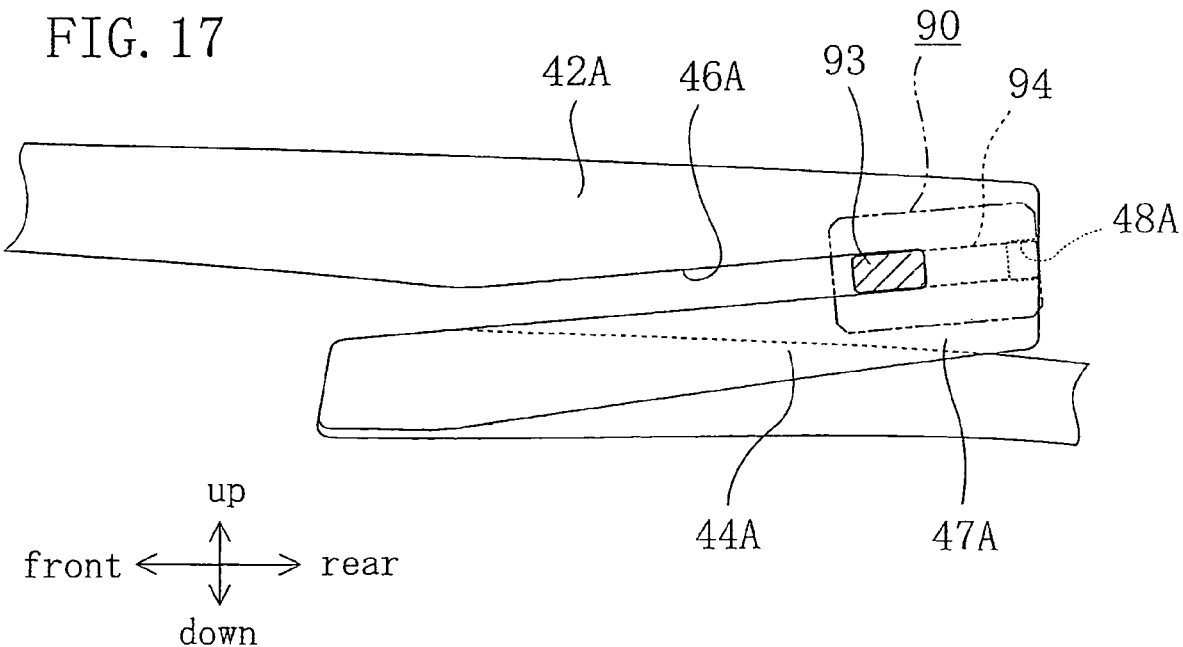
FIG. 17 is a cross-sectional view of the cable holding clip 90 taken along the line I-I in FIG. 16.

Referring to FIGS. 16-17, we explain a structure of the cable holding clip for holding a cable 110 in the temple bodies 42A and 42B. In FIG. 2, the cable holding clip 90 is fixed to the cable 110 in a position away from the image display unit 100 by an adequate length such that the cable 100 extending from the image display unit 100 does not touch the face of the user when the image display unit 100 is mounted on the frame 10. In FIG. 16, the cable holding clip 90 has a holding hole 91 penetrating through the clip 90 in the front-and-rear direction. The cable holding clip 90 is fixed to the cable 110 with glue, after the cable 110 has been inserted into the holding hole 91.

The cable holding clip 90 is made from a synthetic resin material and includes a contact surface 92, a fitting portion 93 protruding from the contact surface 92 in the right direction, and a holding arm 94 extending rearward with protruding from the fitting portion 93. The contact surface 92 is engageable with both a left side surface of the temple body 42A and a left side surface of the auxiliary guide member 44A. The fitting portion 93 is formed so as to slide by fitting to the slide aperture 46A. The holding arm 94 is formed so as to fit to the holding groove 48A formed in a right side surface of the closure portion 47A. In FIG. 17, the holding arm 94 has a width substantially equal to a width of the slide aperture 46A in the up-and-down direction.

<Structures of Image Display Unit and Control Apparatus>

The image display unit 100 contains minimal optical systems because the weight of the image display unit 100 should be reduced as possible. In order to reduce the weight, other optical systems are contained in the control apparatus 200. In the present embodiment, the control apparatus 200 contains a red-green-blue (RGB) image signal supply circuit, RGB laser sources, a laser source driver, and a laser coupling optical system for the RGB laser beams. The cable 110 includes an optical fiber that transmits a coupled RGB laser beam. The image display unit 100 contains internal optical systems such as a collimate lens, a horizontal scan part, a vertical scan part, and an eye lens. In FIG. 9, the image display unit 100 has a light emitting aperture 103. A translucent half mirror 104 is attached to a proximal portion of the light emitting aperture 103. An angle between the half mirror 104 and the light emitting aperture 103 is adjustable by tweaking the half mirror 104.

The image display unit 100 emits the coupled RGB laser beam from the cable 110 to the half mirror 104 via the internal optical systems. The coupled RGB laser beam is reflected by the half mirror 104 and enters the user's eye. When the RGB laser beam stops entering the user's eye, the user can look at a landscape before the eyes through the half mirror 104.

<<Operation>>

Figure 18:
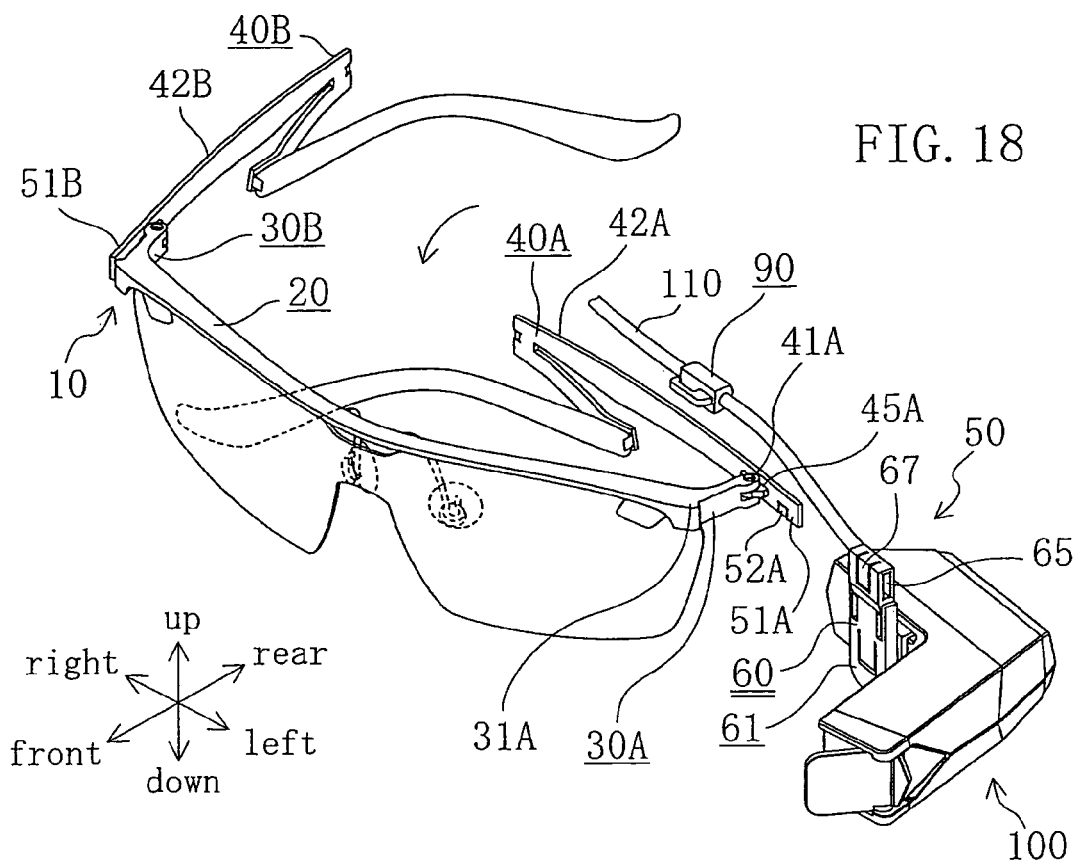
FIG. 18 is an explanatory perspective view that shows a state in which the attachment instrument 60 is detached from the extension member 51A positioned apart from the connection part 30A with the temple part 40A rotated in a counterclockwise direction, right before the image display unit 100 is attached to the extension member 51A.

Referring to FIGS. 18-22, we explain an operation of the embodiment. For each user, it is different whether a left side or a right side is eye-friendly for mounting the image display unit 100. Thus, the user first chooses one of the connection parts 30A and 30B for mounting the image display unit 100. The user changes by 180 degrees an angular position of the attachment instrument 60 relative to the image display unit 100, according to whether the image display unit 100 is mounted on the connection part 30A or 30B. In FIG. 18, a positional relation between the attachment instrument 60 and the image display unit 100 is for attaching the image display unit 100 to the left side connection part 30A.

In case of mounting the image display unit 100 in the right side connection part 30B, the user changes by 180 degrees an angular position of the attachment instrument 60 relative to the image display unit 100 shown in FIG. 18. When the user changes the angular position of the attachment instrument 60 by 180 degrees, the image display unit 100 is used in a state where the unit 100 is rotated by 180 degrees from a state shown in FIG. 18. In this case, an image to be displayed by the laser beam transmitted via the cable 110 is required to be rotated by 180 degrees.

In the present embodiment, we explain how the image display unit 100 is mounted on the left side connection part 30A.

<Positional Adjustment of Image Display Unit Relative to Attachment Instrument>

First, the user needs to determine a position of the image display unit 100 relative to the frame 10 in the up-and-down direction. If the user tends to frequently look at a large display or document in front of the user with seldom looking at images from the image display unit 100, the image display unit 100 is mounted in a relatively lower position so as to clear the user's front view. On the other hand, if the user tends to frequently look at images from the image display unit 100 with rarely moving the user's view, the image display unit 100 is mounted in a position close to the frame 10 because clearing the user's front view is not required. According to the usage of the image display unit 100, the user can adjust a position of the image display unit 100 relative to the attachment instrument 60 both in the up-and-down direction and in the left-and-right direction, and also an angular position of the unit 100 relative to the attachment instrument 60. Concretely, the user can adjust a position of the image display unit 100 in the up-and-down direction with moving the attachment instrument 60 relative to the unit 100 in the up-and-down direction so that the engagement grooves 72 of the slide member 62 may shift a position for engagement with the unit attachment part 68 of the instrument body 61. The user can adjust a position of the image display unit 100 in the left-and-right direction with moving the attachment instrument 60 relative to the unit 100 in the left-and-right direction so that both engagement grooves 78 and 79 of the slide frame 63 may shift positions for engagement with the upper and lower resilient parts disposed inside of the image display unit 100. In addition, the user can adjust an angular position of the image display unit 100 with rotating the attachment instrument 60 relative to the unit 100 so that the circular fitting recess 76 and the circular fitting hole 77 of the slide frame 63 may be rotated along both circumferential surfaces of the circular protrusion 70 of the slide member 62 and the disk portion 82 of the rotation disk 60.

<Retaining Operation of Image Display Unit>

Figure 19:
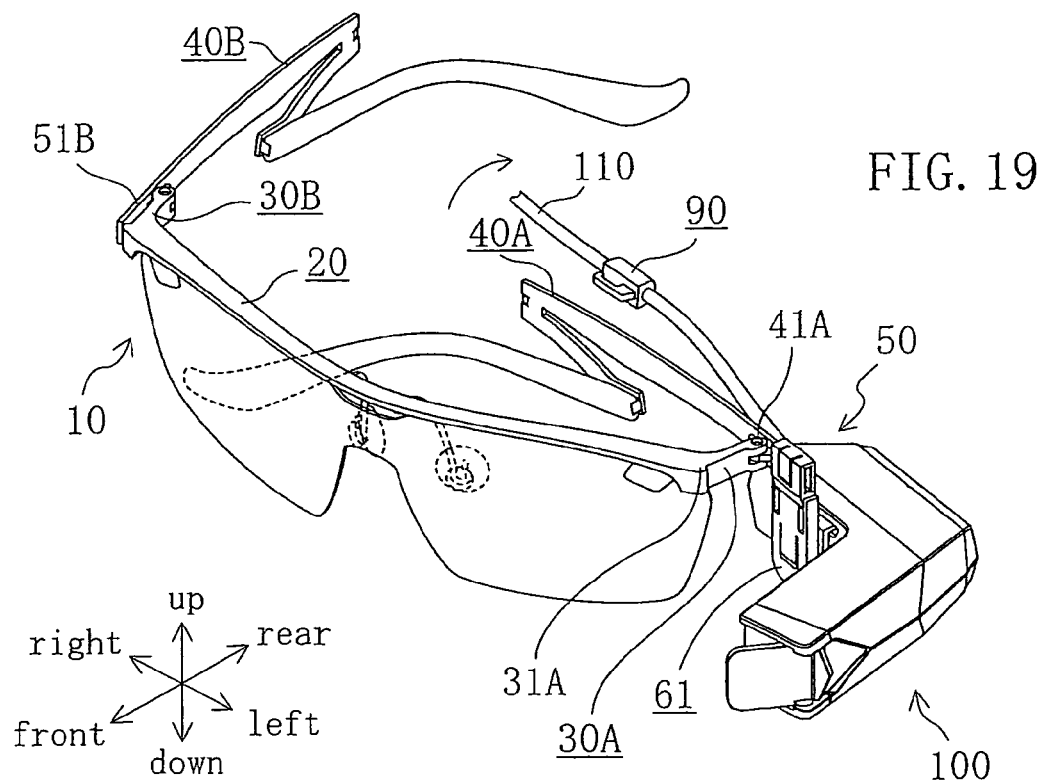
FIG. 19 is an explanatory perspective view that shows a state in which the attachment instrument 60 has been attached to the extension member 51A.

Under a state that the frame 10 is not mounted on the user, the user separates the extension member 51A from the connection part 30A by rotating the left side temple part 40A in a counterclockwise direction as shown in FIG. 18. The user fits the attachment hole 65 of the instrument body 61 to the front end portion of the extension member 51A. With this fitting operation, the frame attachment part 67 of the instrument body 61 fits to the notch groove 52A of the extension member 51A. By fitting of the frame attachment part 67 to the notch groove 52A, a position of the attachment instrument 61 relative to the extension member 51A is determined in the front-and-rear direction, so that the attachment instrument 60 is retained in the frame 10. In addition, a rear end surface of the instrument body 61 abuts onto the planar surface 45A-1 of the connection portion 45A of the temple body 42A. By this abutment, the instrument body 61 is prevented from moving reward on the extension member 51A. In FIG. 19, it is shown that the image display unit 100 is mounted on the frame 10.

Figure 20:
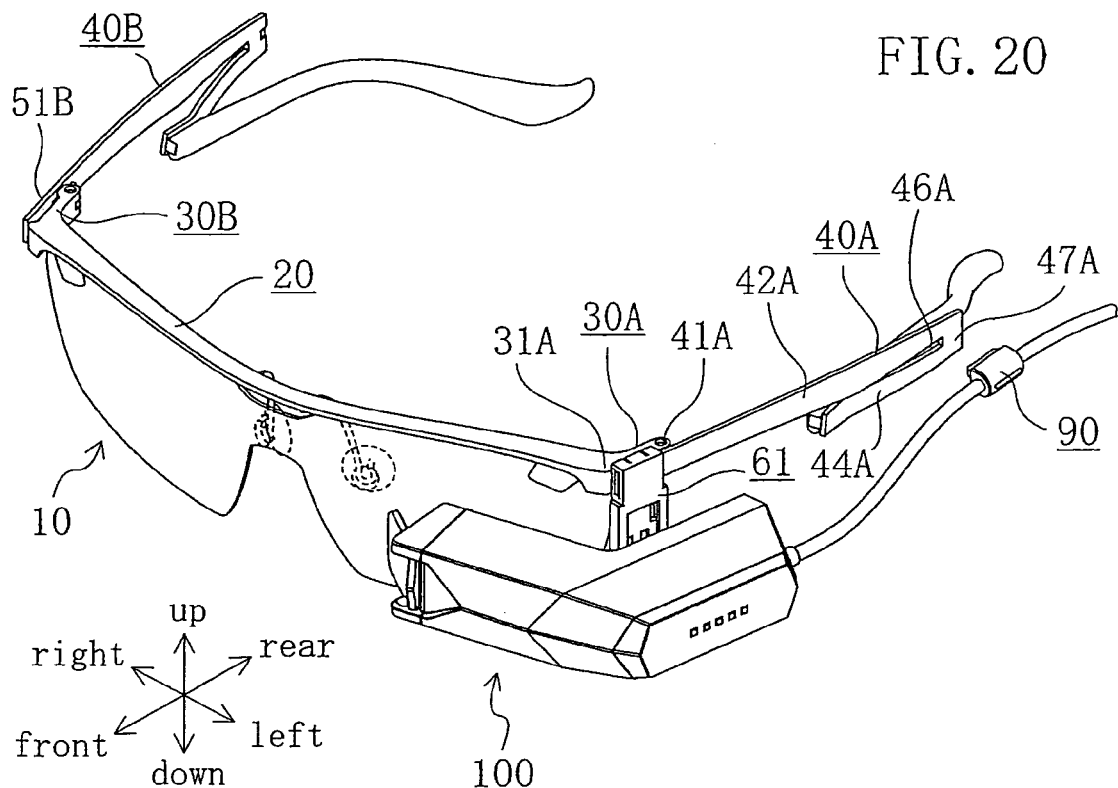
FIG. 20 is an explanatory perspective view that shows a state in which the attachment instrument 60 is attached to the extension member 51A positioned close to the connection part 30A with the temple part 40A rotated in a clockwise direction.

In order to certainly keep the state of mounting the image display unit 100, the user rotates the temple part 40A in a clockwise direction around an axis of the mounting screw 41A, from a state of the temple part 40A shown in FIG. 19, so that the extension member 51A and the instrument body 61 come close to the connection part 30A. In FIG. 20, it is shown that the extension member 51A and the instrument body 61 are placed close to the connection part 51A. In the state of the instrument body 61 shown in FIG. 20, the front portion 31A of the connection part 30A is disposed to protrude in front of the front end surface of the instrument body 61. By the protruding configuration of the front portion 31A, the instrument body 61 is prevented from moving forward and falling out of the extension member 51A. The image display unit 100 is certainly retained in the extension member 51A by an easy operation, namely rotating the temple part 40A. There is no need for a special operation such as screwing a retaining screw.

<Holding Operation of Cable>

Figure 21:
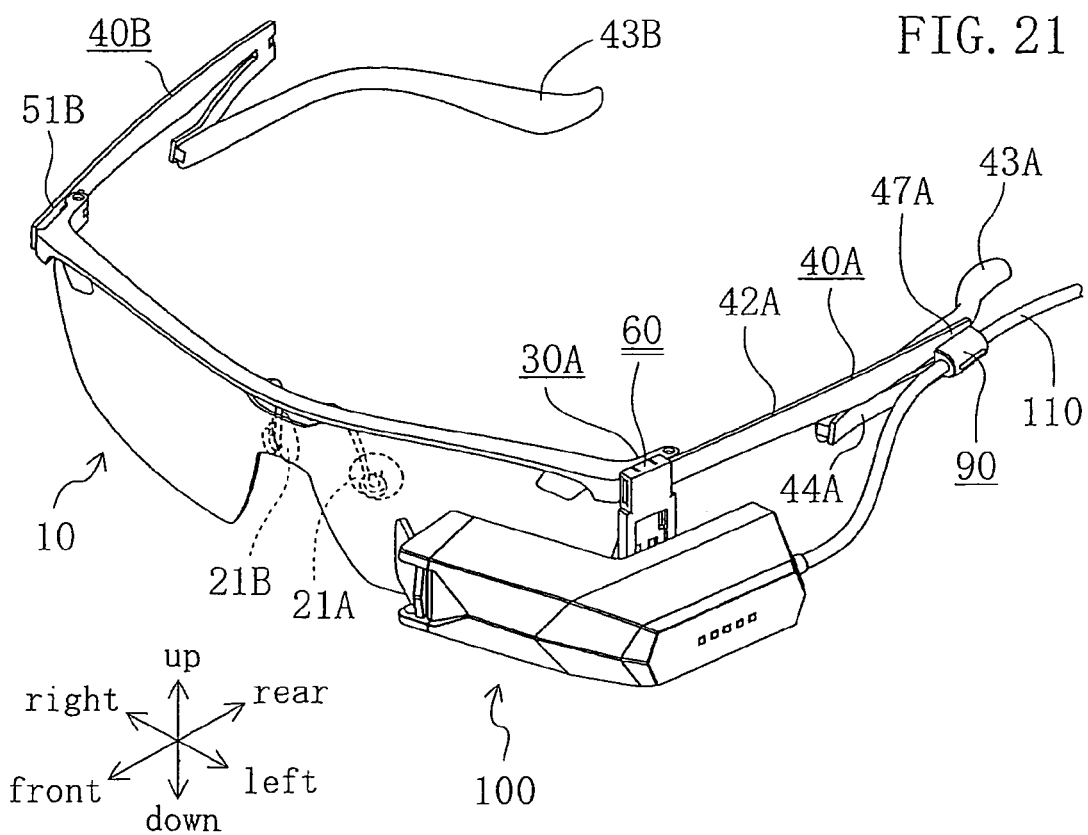
FIG. 21 is an explanatory perspective view that shows a state in which the cable holding clip 90 is held in the temple body 42A.

In FIG. 20, the cable holding clip 90 fixed to the cable 110 is separated from the temple part 40A. In the state of the cable holding clip 90 shown in FIG. 20, the user fits the fitting portion 93 and the holding arm 94 of the clip 90 to the slide aperture 46A, and then moves rearwards the clip 90 along the slide aperture 46A. The holding arm 94 fits to the holding groove 48A of the closure portion 47A as shown in FIG. 16, so that the cable holding clip 90 is held in the temple body 42A. Usually, the user fits the frame attachment part 67 of the instrument body 61 to the notch groove 52A of the extension member 51A, thereby retaining the attachment instrument 60 in the frame 10. After retaining the attachment instrument 60, the user performs an operation for attaching the cable holding clip 90 to the temple 40A. In FIG. 21, it is shown that the cable holding clip 90 is retained in the temple part 40A.

<Mounting Operation of Frame>

The user mounts the frame 10 on the user's head with the cable holding clip 90 retained in the temple part 40A as shown in FIG. 21. As shown in FIG. 1, the user mounts the nose mounting parts 21A and 21B on the user's nose, and mounts the ear mounting parts 43A and 43B on the user's ear. The distance between the temple parts 40A and 40B, especially the distance between the ear mounting parts 43A and 43B changes according to the size of the user's head. The distance usually becomes larger than the distance under the natural state shown in FIG. 4. This widened distance between the temple parts 40A and 40B causes bending moments around the rotation axes of the mounting screws 41A and 41B. A clockwise bending moment around the rotation axis of the retaining screw 41A is put on the temple body 42A.

Figure 22:
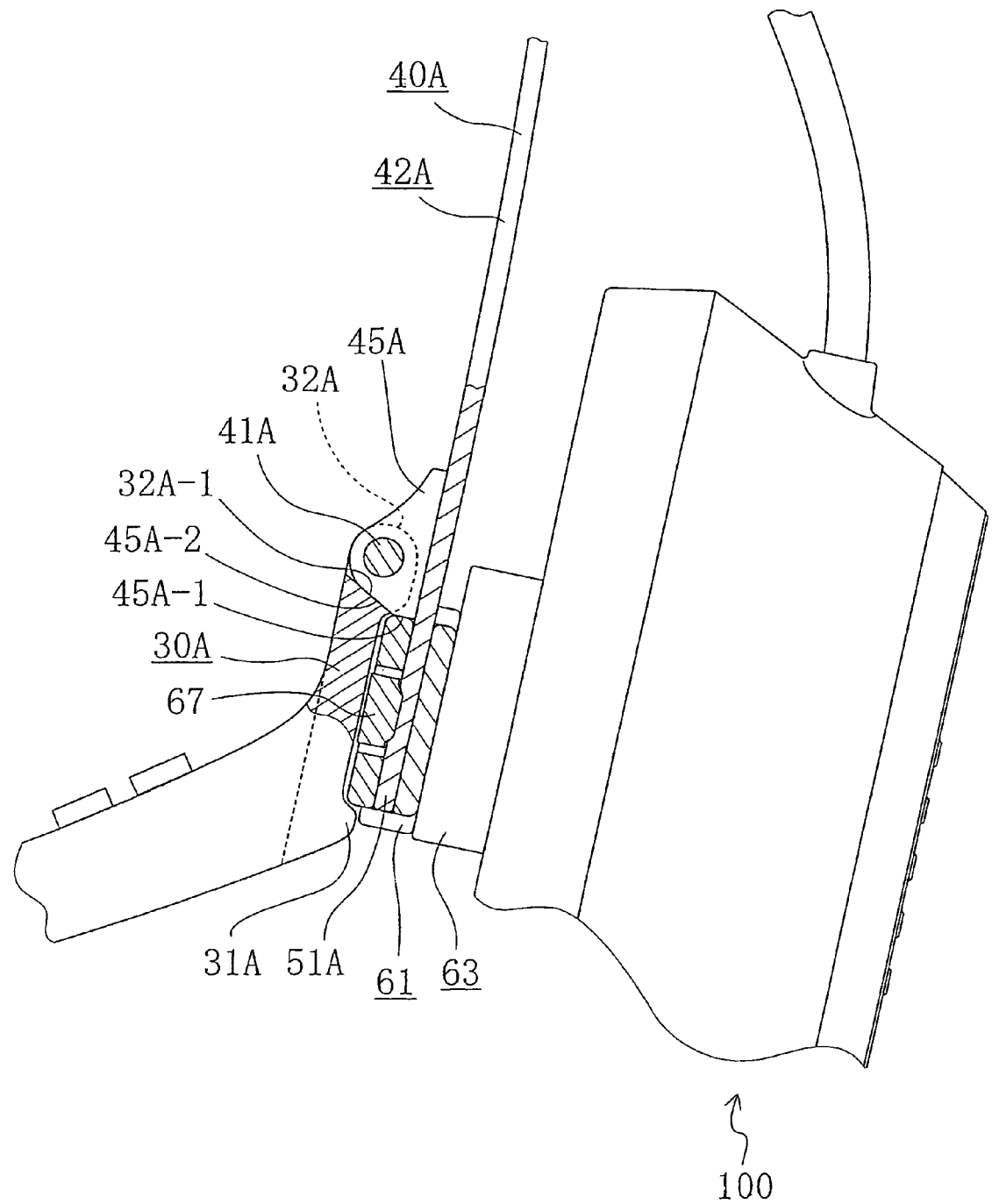
FIG. 22 is a partially cross-sectional view that shows a positional relation between the instrument body 61 and the connection part 30A with the attachment instrument 60 and the extension member 51A positioned close to the connection part 30A.

When the distance between the temple parts 40A and 40B is widened, the inclined planar surface 45A-2 of the connection portion 45A of the temple body 42A is engaged with the inclined planar surface 32A-1 of the rear end portion 32A of the connection part 30A, so that the temple part 40A is prevented from rotating in the clockwise direction in FIG. 22. The extension member 51A and the instrument body 61 are positioned relative to the connection part 30A. In order to prevent the instrument body 61 from moving rearwards, the rear end surface of the instrument body 61 is engaged with the planar surface 45A-1 of the connection portion 45A, while other portions including the front end surface of the instrument body 61 are positioned relative to the connection part 30A without engagement with the connection part 30A. That is to say, the instrument body 61 does not come into contact with the connection part 30A, until the temple part 40A is prevented from rotating in the clockwise direction in FIG. 22 by engagement of the inclined planar surface 45A-2 with the inclined planar surface 32A-1. Since the instrument body 61 does not come into contact with the connection part 30A, the extension member 51A does not deform by the bending moment around the axis of the mounting screw 41A which is caused by rotation of the temple part 40A in the clockwise direction. Although the temple body 42A disposed rearwards from the connection portion 45A deforms by the bending moment when the distance between the temple parts 40A and 40B is further widened after the temple part 40A is prevented from rotation in the clockwise direction, the extension member 51A disposed forward from the connection portion 45A hardly deforms. As a result, the extension member 51A and the instrument body 61 are not influenced by the bending moment, thereby maintaining a constant positional relation with the connection part 30A. The position of the image display unit 100 relative to the user's eye is prevented from changing when the user mounts the frame 10.

In addition, the front part 20 and the connection part 30A are more rigid than the temple body 42A, namely harder to deform against the bending moment caused by the user's operation of rotating the temple part 40A, so that the position of the image display unit 100 is prevented from changing with deformation of the front part 20 and the connection part 30A.

The cable holding clip 90 is retained in the closure portion 47A which is formed integrally with the temple body 42A, and the attachment instrument 60 is retained in the extension member 51A fixed to the temple body 42A. By such structure of the cable holding clip 90 and the attachment instrument 60, the distance between the image display unit 100 and the closure portion 47A in which the cable holding clip 90 is retained is not changed even if the user rotates the temple part 40A in the state that the image display unit 100 is attached to the frame 10 as shown in FIG. 21. As a result, excessive tension is not put on the cable 110 when the user rotates the temple part 40A. The cable holding clip 90 is certainly prevented from detaching from the closure portion 47A and drooping in front of the user's face. In considering a different structure from the present embodiment, namely a structure that the attachment instrument 60 is retained in the front part 20 or the connection part 30A, the distance between a position of the retained attachment instrument 60 and a position of the cable holding clip 90 retained in the temple part 40A is changed when the user rotates the temple part 40A. In such different structure, there is a possibility that excessive tension is put on the cable 110 by change of the distance between the above positions when the user rotates the temple part 40A. In addition, there is a possibility that the cable holding clip 90 is detached from the temple part 40A when the user rotates the temple part 40A. Therefore, there are problems in mounting the frame 10 in such different structure. In the present embodiment, it is easy for the user to mount or remove the frame 10 and the image display unit 100, because there is not any trouble such as drooping of the cable 110 and detaching of the cable holding clip 90.

The user may change the direction, in which the coupled RGB laser beam emits, so as to clearly look at images from the image display unit 100 by tweaking the half mirror 104 with the frame 10 mounted on the user. Further, the user may adjust a position of the image display unit 100 relative to the attachment instrument 60 in the up-and-down direction and in the left-and-right direction, and also angular position of the image display unit 100 relative to the attachment instrument 60 around a rotation axis of the mounting screw 41A with the frame 10 mounted on the user.

<Removing Operation of Image Display Unit>

In order to remove the image display unit 100 from the frame 10, the user rotates the temple part 40A in the counterclockwise direction from the state of retaining the image display unit 100 in FIG. 21, after the user detaches the frame 10 from the user's head. By rotating the temple part 40A, the attachment instrument 60 and the extension member 51A is separated from the connection part 30A. The front end surface of the instrument body 61 is released from a state where it is prevented from forward movement in the extension member 51A, so that it is possible for the user to move forward the attachment instrument 60 in the extension member 51A. Even though the temple part 40a is rotated, the cable holding clip 90 is maintained in a state where the clip 90 is retained in the closure portion 47A. The user may release the cable holding clip 90 from engagement with the holding groove 48A of the closure portion 47A, by gently sliding the clip 90 in the forward direction. When the user detaches the attachment instrument 60 from the extension member 51A by forwardly moving the attachment instrument 60 in the above state of releasing the cable holding clip 90, the clip 90 is moved in a direction of sloping down toward the opened end of the slide aperture 46A. The cable holding clip 90 is naturally removed from the opened end of the slide aperture 46A. In some cases, the cable holding clip 90 is naturally removed from an intermediate part of the slide aperture 46A before the clip 90 reaches the opened end of the slide aperture 46A, because the fitting portion 93 and the holding arm 94 of the clip 90 are substantially equal to the slide aperture 46A in width. Further, the cable 110 and the cable holding clip 90 removed from the slide aperture 46A are not caught on the temple body 42A, because the image display unit 100 is disposed under the extension member 51A and the slide aperture 46A is formed below the temple body 42A. As a result, it is easy for the user to remove the image display unit 100 from the frame 10.

Considered is a case that a resilient force of the holding arm 94 of the cable holding clip 90 is strong enough to maintain fitting of the holding arm 94 to the holding groove 48A, but is not so strong that excessive tension is put on the cable 110. In this case, when the user detaches the attachment instrument 60 from the extension member 51A by moving forward the attachment instrument 60 in the state of retaining the cable holding clip 90 in the closure portion 47A, the clip 90 is moved toward the opened end of the slide aperture 46A, so that the clip 90 is naturally removed from the opened end or from an intermediate part of the slide aperture 46A before the clip 90 reaches the opened end.

<<Advantages of Embodiment>>

In the present embodiment described above, there are following advantages.

The retaining mechanism 50 is configured to retain the image display unit 100 in the extension member 51A. The retaining mechanism 50 is prevented from interrupting the user's front view. The retaining mechanism 50 makes it possible to dispose the image display unit 100 in an area at which the user easily look, without a large movement of the direction of eyes. Furthermore, when the user mounts the frame 10 on the user's head, the temple part 40A deforms according to the size of the user's head, but the extension member 51A is hardly influenced by deformation of the temple part 40A because the extension member 51A is disposed in front of the connection portion 45A of the temple part 40A connected to the connection part 30A. The position of the image display unit 100 retained in the extension member 51A is prevented from changing by deformation of the temple part 40A. As a result, the extension member 51A prevents a position of an image to be displayed in the user's eye by the image display unit 100 from changing by deformation of the temple part 40A.

The user retains the image display unit 100 in the extension member 51A by attaching the unit attachment part 68 of the attachment instrument 60 to the image display unit 100 and also by fitting the frame attachment part 67 of the attachment instrument 60 to the extension member 51A. As a result, it is easy for the user to retain the image display unit 100 in the frame 10 by fitting the frame attachment part 67 to the extension member 51A.

The image display unit 100 is retained in the extension member 51A with the front end portion of the extension member 51A fitting to the attachment hole 65 of the frame attachment part 67. As a result, it is easy for the user to retain the image display unit 100 in the extension member 51A by fitting the attachment hole 65 to the front end portion of the extension member 51A in a state where the temple part 40A is rotated such that the extension member 51A is placed apart from the connection part 30A.

The forward portion 31A of the connection part 30A prevents the frame attachment part 67 from moving forward when the user mounts the temple part 40A on the user's ear in a state where the front end portion of the extension member 51A fits to the attachment hole 65. As a result, the image display unit 100 is certainly prevented from removing from the extension member 51A when the user mounts the temple part 40A on the user's ear.

The image display unit 100 is retained in the extension member 51A with the resilient lower end of the frame attachment part 67 engaged with the notch groove 52A of the extension member 51A. As a result, it is easy for the user to retain the image display unit 100 in the extension member 51A by fitting the frame attachment part 67 to the extension member 51A, and also the elastic force of the resilient lower end certainly maintains the state of retaining the image display unit 100.

The unit attachment part 68 of the attachment instrument 60 is detachably attached to the image display unit 100. As a result, it is easy for the user to attach the image display unit 100 to or detach the unit 100 from the unit attachment part 68, so that the user can exchange the unit 100 readily.

A part of the image display unit 100 or a member attached to the unit 100 fits to the attachment groove 66 of the instrument body 61. The resilient lower portion of the unit attachment part 68 maintains the state of fitting of the part of the unit 100 or the attached member to the attachment groove 66. As a result, it is easy for the user to attach the image display unit 100 to the instrument body 61 by fitting the part of the unit 100 or the attached member to the attachment groove 66, and also the elastic force of the resilient lower portion certainly maintains the state of retaining the image display unit 100.

An angular position of the image display unit 100 is adjustable around an adjustment axis in the left-and-right direction in which a center line of the circular protrusion 70 extends. As a result, the user can adjust the angular position of the unit 100 to the easiest position to look at a displayed image with mounting the temple parts 40A and 40B on the user's ears.

The instrument body 61 has the attachment hole 65 penetrating in the front-and-rear direction. The angular position of the image display unit 100 is adjustable around the adjustment axis by at least 180 degrees. As a result, it is possible for the user to attach the attachment hole 65 to either of the left and right extension members 51A and 51B, so that the user may retain the image display unit 100 in either of the left and right sides of the frame 10 with changing the angular position of the unit 100 by 180 degrees.

Both the front part 20 and the connection parts 30A and 30B are more rigid than the temple parts 40A and 40B. When the user mounts the temple parts 40A and 40B on the user's ears, the deformation of the temple parts 40A and 40B little affects the front part 20 and the connection parts 30A and 30B. Since the image display unit 100 is retained in the extension member 51A extending in front of the connection portion 45A in which the rigid connection part 30A is connected with the temple part 40A, the image display unit 100 is kept in a fixed position relative to the user's eye.

The slide aperture 46A extends in the front-and-rear direction along the temple part 40A, and is opened at its front end portion. The cable holding clip 90 is attached from the opened front end portion and is slidable along the slide aperture 46A. As a result, it is easy for the user to attach the cable holding clip 90 to the slide aperture 46A from the opened front end portion. In addition, when the user detaches the image display unit 100 from the extension member 51A, the cable holding clip 90 connected with the image display unit 100 via the cable 110 slides forward along the slide aperture 46A, and then is certainly detached from the opened front end portion. Thus, it is easy for the user to detach the image display unit 100 and the cable holding clip 90 from the frame 10.

The resilient holding arm 94 of the cable holding clip 90 is engageable with the closure portion 47A which closes the rear end of the slide aperture 46A. As a result, the cable holding clip 90 is kept at a fixed position in the temple part 40A, so that the cable 110 is maintained adequately loosening between the image display unit 100 and the cable holding clip 90.

When the fitting portion 93 of the cable holding clip 90 fits to the slide aperture 46A, the resilient holding arm 94 is placed in the other side of the temple part 40A with protruding from the fitting portion 93, and extends rearward in a direction parallel to the slide aperture 46A. As a result, when the user slides the cable holding clip 90 along the slide aperture 46A to engage the resilient holding arm 94 with the holding groove 48A of the closure portion 47A, the frictional resistance between the resilient holding arm 94 and the closure portion 47A is applied in parallel to a extending direction of the holding arm 94. Thus, the user can smoothly engage the holding arm 94 with the holding groove 48A, without deformation of the holding arm 94 in a direction intersecting with the extending direction of the holding arm 94.

The image display unit 100 is retained under the extension member 51A. The temple part 40A includes the temple body 42A and the auxiliary guide member 44A, which is disposed under the temple part 40A and extends forward in parallel to the temple part 40A. The slide aperture 46A is formed between the temple part 40A and the auxiliary guide member 44A. As a result, when the user detaches the image display unit 100 from the extension member 51A, the cable holding clip 90 slides forward along the slide aperture 46A and then is detached downward from the slide aperture 46A. Thus, it is easy and smooth for the user to detach the image display unit 100 and the cable holding clip 90 without the cable 110 caught on the temple body 42A.

Modifications of Embodiment

Although the embodiment has been described above in detail, the scope of this invention is not limited thereto. It will be appreciated by those of ordinary skill in the relevant art that various modifications may be made without departing from the scope of the invention. We explain several examples of the modifications here. Accordingly, the embodiment disclosed herein is exemplary, and are not limiting the scope of the invention. It is to be understood that the scope of the invention is to be determined by the claims which follow.

In the embodiment, only one connection part may be configured to be fixed to one side of the front part 20. In this configuration, one temple part is connected with the one side of the front part 20 via the connection part, while the other temple part is connected directly with the other side of front part 20.

In the embodiment, any type of a device capable of displaying an image to the user may be utilized as the image display unit 10. For example, there may be utilized a display device having a liquid crystal screen in place of the retinal scanning display. In addition, the optical system for emitting an image light beam includes a lens and a mirror for emitting the image light beam from the image display unit 100. As the optical system, there may be utilized either of a system equipped with light sources such as laser sources and a system to which light beams are transmitted from light sources via an optical fiber.

Any configuration may be utilized as the retaining mechanism 50, if it is possible to attach the image display unit 100 to or detach the unit 100 from the extension member 51A and also to retain the unit 100 at a fixed position in the extension member 51A, without the unit 100 and the extension member 51A disassembled or damaged.

In the embodiment, the instrument body 61 is not limited to a configuration that the attachment hole 65 fits to the extension member 51A from the front direction. For example, the instrument body may be configured to be attached to the extension member from the up-and-down direction or from the left-and-right direction.

In the embodiment, the instrument body 61 is not limited to a configuration having the attachment hole 65 penetrating in the front-and-rear direction. For example, in place of the attachment hole 65, the instrument body may have a fitting recess which is opened only at its rear end so that the forward portion of the extension member can fit to the fitting groove.

In the embodiment, the forward portion 31A of the connection part 30A is limited to a configuration that the forward portion 31A is always in contact with a part of the instrument body 61 when the user mounts the temple parts 40A and 40B on the user's ears with the front end of the extension member 51A fitting to the attachment hole 65. For example, the forward portion of the connection part may come into contact with the instrument body so as to prevent the instrument body from moving forward, when the instrument body is moved forward beyond an acceptable limit.

In the embodiment, the extension member 51A is not limited to a configuration having the notch groove 52A engageable with the resilient frame attachment part 67. For example, the extension member may have a projection in its side surface, in place of the notch groove 52A.

In the embodiment, any configuration may be utilized as the instrument body 61 and the image display unit 100, if it is possible to attach the image display unit 100 to or detach the unit 100 from the instrument body 61, without the instrument body 61 and the unit 100 disassembled or damaged.

In the embodiment, any type of a cable may be utilized as the cable 110, if it is possible to transmit a signal necessary for displaying an image. For example, the cable may be of an optical fiber which transmits light beams such as RGB laser beams in case the control apparatus 200 includes built-in light sources. Alternatively, the cable may be of a signal line which transmits RGB image signals in case the image display unit 100 includes built-in light sources. Further, any configuration may be utilized as the control apparatus 200. For example, the control apparatus may be configured as an external apparatus to control the display operation of the image display unit 100. Alternatively, the control apparatus may be configured as an external processing apparatus which can receive a signal such as image data via the Internet or a wireless communication system and then transmit the signal to the image display unit 100 via a connection line, in case the image display unit 100 includes a built-in control device for controlling the display operation.

In the embodiment, the resilient holding arm 94 is not limited to a configuration that the holding arm extends in parallel to the slide aperture 46A. For example, the holding arm may be configured to extend in a direction intersecting with the slide aperture 46A and to fit to the closure portion 47A.

In the embodiment, the image display unit 100 is retained in either of the left and right sides of the frame 10. The two image display units 100 may be retained in the frame 10. Namely, one image display unit 100 may be retained in the left side of the frame 10, and the other image display unit 100 may be retained in the right side of the frame 10.

In the embodiment, the attachment instrument 60 is attached to the extension member 51A from the forward portion. The attachment instrument may be attached to the extension member 51A in the left-and-right direction or in the up-and-down direction. In this modification, it is required to form a groove and a projection to be engaged each other in a direction perpendicular to the attachment direction in which the attachment instrument is attached, in order to prevent the attachment instrument from falling out of the extension member. Further, in the embodiment, the extension member 51A extends forward from the connection portion 45A of the temple part 40A. Alternatively, any forward portion extending in front of the connection portion 45A may be utilized as the extension member 51A. For example, the extension member includes the forward portion, and a rearward portion which is connected to the forward portion and extends rearward from the connection portion 45A. In this modification, the image display unit 100 may be retained in the rearward portion. Furthermore, if the forward portion of the extension member is bent by 180 degrees so as to extend rearward, the attachment instrument may be attached from the rear end of the bent forward portion.

In the embodiment, the attachment instrument 60 is configured to be not in contact with the connection part 30A, when the attachment instrument 60 comes close to the connection part 30A by rotation of the temple part 40A with the attachment instrument 60 retained in the extension member 51A. Alternatively, a part of the attachment instrument may be pressed by engagement with the connection part. In this modification, when the temple part 40A is rotated, the bending moment might cause the extension member retaining the attachment instrument to deform. Since the connection part is more rigid than the temple part and the extension member, the extension member deforms within a limited amount according to the shape of the connection part. Thus, the connection part is maintained at a fixed position relative to the connection part, so that the position of the image display unit is hardly changed by the bending moment.

In the embodiment, the attachment instrument 60 includes the instrument body 61, the slide member 62, the slide frame 63 and the rotation disk 64 in order to adjust the position of the image display unit 100 in the up-and down direction and in the left-and-right direction as well as the angular position of the unit 100. If it is not necessary to adjust the position of the unit 100 in the left-and-right direction, the slide member 62 may be connected directly with the unit 100 to be rotatable relative to the unit 100.

In the embodiment, the front part 20 and the connection parts 30A and 30B are different from the temple bodies 42A and 42B in constituent materials and cross-sectional shapes. Owing to theses differences, the former are more rigid than the latter. However, either constituent materials or cross-sectional shapes may be different between the former and the latter.

In the embodiment, the attachment instrument 60 of the same shape is attached to either of the left and right extension members 51A and 51B. Alternatively, two special attachment instruments may be utilized corresponding to the left and right extension members 51A and 51B.

What is claimed is:

1. A head mounted display device comprising:
   a frame including,
      a front part mountable on a user's nose and extending in a right-and-left direction in front of the user's eye,
      a connection part fixed to at least one edge portion of right and left side edges of the front part and extending in a rearward direction from the one edge portion, and
      a temple part mountable on the user's ear and rotatably connected with the connection part around a rotation axis extending along an up-and-down direction, the temple part including a connection portion for rotatably connecting with the connection part;
   an image display unit including an optical system and configured to generate an image to be displayed for the user;
   an extension member extending forward the connection portion of the temple part; and
   a retaining mechanism configured to retain the image display unit detachably in the extension member.

2. The head mounted display device according to claim 1, wherein the retaining mechanism includes an attachment instrument configured to attach the image display unit to the extension member, and
   wherein the attachment instrument includes:
      an unit attachment part attached to a specific portion of the image display unit; and
      a frame attachment part engageable with the extension member.

3. The head mounted display device according to claim 2, wherein the frame attachment part includes an attachment recess engageable with a front end portion of the extension member, and extending in a front-and-rear direction.

4. The head mounted display device according to claim 3, wherein a forward portion of the connection part is formed to protrude toward the extension member, and wherein the forward portion of the connection part restricts movement of the frame attachment part in a forward direction, when the temple part is mounted on the user's ear with the front end portion of the extension member engaged with the attachment recess.

5. The head mounted display device according to claim 2, wherein the frame attachment part includes a first resilient member engageable with one side surface of the extension member.

6. The head mounted display device according to claim 5, wherein the unit attachment part is detachably attached to the image display unit.

7. The head mounted display device according to claim 6, wherein the unit attachment part includes:
   an aperture engageable with a specific portion of the image display unit or a member attached to the image display unit; and
   a second resilient member engageable with the specific portion or the attached member engaged with the aperture.

8. The head mounted display device according to claim 2, wherein the image display unit is attached to the unit attachment part such that an angular position of the image display unit is adjustable around an adjustment axis perpendicular to both the rotation axis of the temple part and a front-and-rear direction in which the extension member extends, when the temple part is mounted on the user's ear with the image display unit retained by the retaining mechanism.

9. The head mounted display device according to claim 8, wherein the frame includes a pair of the connection parts fixed to both side edges of the front part, and a pair of the temple parts attached to both connection parts,
   wherein a pair of the extension members are disposed in both temple parts,
   wherein the frame attachment part includes an attachment recess formed as a through hole penetrating in a front-and-rear direction, and
   wherein the image display unit is attached to the unit attachment part so as to be rotated at least 180 degrees around the adjustment axis.

10. The head mounted display device according to claim 1, wherein both the front part and the connection part are more rigid than the temple part such that deformation of the front part and the connection part caused by a bending moment around the rotation axis are reduced.

11. The head mounted display device according to claim 1, wherein the image display unit is configured to receive signals from an external apparatus via a cable to display an image,
   wherein the temple part includes a slide groove in which a cable holder holding the cable is slidable, and
   wherein the slide groove extends in a front-and-rear direction along the temple part, and is formed to open forward.

12. The head mounted display device according to claim 11,
   wherein the temple part includes a closure portion closing a rearward portion of the slide groove, and
   wherein the cable holder includes a third resilient member engageable with the closure portion.

13. The head mounted display device according to claim 12,
   wherein the cable holder includes:
      a contact surface in contact with one side surface of the temple part; and
      a fitting portion protruding from the contact surface and formed to fit to the slide groove,
   wherein the third resilient member is positioned on the other surface of the temple part with protruding from the fitting portion and extends rearward and parallel to the slide groove, when the fitting portion fits to the slide groove.

14. The head mounted display device according to claim 11,
   wherein the image display unit is retained by the retaining mechanism to be disposed under the extension member,
   wherein the temple part includes:
      a temple body extending rearward from the extension member; and
      a auxiliary guide member fixed to a rearward portion of the temple body and extending forward along the temple body under the temple body, and
   wherein the slide groove is formed between the temple body and the auxiliary guide member.

15. A mounting device for an image display unit having an optical system to generate an image to be displayed for a user, the mounting device comprising:
   a frame including,
      a front part mountable on the user's nose and extending in a right-and-left direction in front of the user's eye,
      a connection part fixed to at least one edge portion of right and left side edges of the front part and extending in a rearward direction from the one edge portion, and
      a temple part mountable on the user's ear and rotatably connected with the connection part around a rotation axis extending along an up-and-down direction, the temple part including a connection portion for rotatably connecting with the connection part;
   an extension member extending forward the connection portion of the temple part; and
   a retaining mechanism configured to retain the image display unit detachably in the extension member.

\* \* \* \* \*